(12) United States Patent
Imai

(10) Patent No.: US 8,885,640 B2
(45) Date of Patent: Nov. 11, 2014

(54) PATH CONTROL METHOD, COMMUNICATION SYSTEM, AND COMMUNICATION APPARATUS

(75) Inventor: Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 12/961,643

(22) Filed: Dec. 7, 2010

(65) Prior Publication Data
US 2011/0142041 A1 Jun. 16, 2011

(30) Foreign Application Priority Data
Dec. 11, 2009 (JP) ................................. 2009-281893

(51) Int. Cl.
*H04L 12/28* (2006.01)
*H04L 12/721* (2013.01)
*H04L 12/773* (2013.01)
*H04L 12/729* (2013.01)

(52) U.S. Cl.
CPC ............ *H04L 45/124* (2013.01); *H04L 45/60* (2013.01); *H04L 45/123* (2013.01); *H04L 45/125* (2013.01)
USPC ........... 370/389; 370/235; 370/236; 370/237; 370/238

(58) Field of Classification Search
CPC ....... H04L 45/00; H04L 45/121; H04L 47/10; H04L 49/351; H04L 29/0653
USPC ......................................... 370/389, 235–238
See application file for complete search history.

(56) References Cited

U.S. PATENT DOCUMENTS

| | | | | |
|---|---|---|---|---|
| 5,752,217 A * | 5/1998 | Ishizaki et al. | ................ | 701/410 |
| 6,857,026 B1 * | 2/2005 | Cain | ............................. | 709/239 |
| 7,457,240 B2 * | 11/2008 | Oki et al. | ...................... | 370/230 |
| 7,680,046 B2 | 3/2010 | Nakamichi et al. | | |
| 7,818,450 B2 * | 10/2010 | Chen et al. | ..................... | 709/238 |
| 8,149,715 B1 * | 4/2012 | Goel et al. | .................... | 370/238 |
| 8,320,288 B2 * | 11/2012 | Sakoda | ........................ | 370/311 |
| 2002/0061012 A1 * | 5/2002 | Thi et al. | ....................... | 370/352 |

(Continued)

FOREIGN PATENT DOCUMENTS

| | | |
|---|---|---|
| JP | 2004-048330 A | 2/2004 |
| JP | 2008-311830 A | 12/2008 |

OTHER PUBLICATIONS

Gupta, Maruti et al., "Greening of the Internet", SIGCOMM 2003, Proceedings of the 2003 conference on Applications, technologies, architectures, and protocols for computer communications (2003) Aug. 20, 2003, pp. 19-26.

(Continued)

*Primary Examiner* — Jonathan C Teixeira Moffat
*Assistant Examiner* — Eyob Hagos
(74) *Attorney, Agent, or Firm* — Fujitsu Patent Center

(57) ABSTRACT

A path control method for controlling paths among edge nodes on a network wherein a plurality of nodes, including relay nodes and multiple edge nodes, are connected via links, the method including determining paths in a specified plurality of edge nodes, path information indicating the paths determined by an edge node that determines paths earlier is transmitted to an edge node that determines paths subsequently, each edge node that determines paths subsequently determines additional paths by prioritizing the use of paths indicated by the path information, and conducting path control on the network by using the path information obtained as a result of paths being determined by the last edge node from among the specified plurality of edge nodes.

19 Claims, 39 Drawing Sheets

(56) References Cited

U.S. PATENT DOCUMENTS

| | | | |
|---|---|---|---|
| 2004/0230638 A1* | 11/2004 | Balachandran et al. | 709/200 |
| 2005/0135379 A1* | 6/2005 | Callaway et al. | 370/395.31 |
| 2007/0008949 A1* | 1/2007 | Balandin | 370/351 |
| 2008/0259875 A1* | 10/2008 | Nath | 370/332 |
| 2011/0128886 A1* | 6/2011 | Husney | 370/254 |

OTHER PUBLICATIONS

Arai, Daisuke et al., "Proposal on Distributed Eco Protocol for Reducing Network Power Consumption", Collected Papers of Lectures in IEICE (The Institute of Electronics, Information and Communication Engineers) National Convention, Communication 2, Japan, The Institute of Electronics, Information and Communication Engineers, Mar. 4, 2009, B-7-105, pp. 249 (Pursuant to MPEP §609, in fulfillment of the requirement under 37 CFR §1.98(a)(3)(i) for a concise explanation of relevance regarding this cited reference, the Office's attention is directed to the Partial English-language translation of the official action mailed by the JPO as listed and described below in this section of form SB08.).

Japanese Office Action mailed Apr. 23, 2013 for corresponding Japanese Application No. 2009-281893, with Partial English-language Translation.

* cited by examiner

FIG. 4
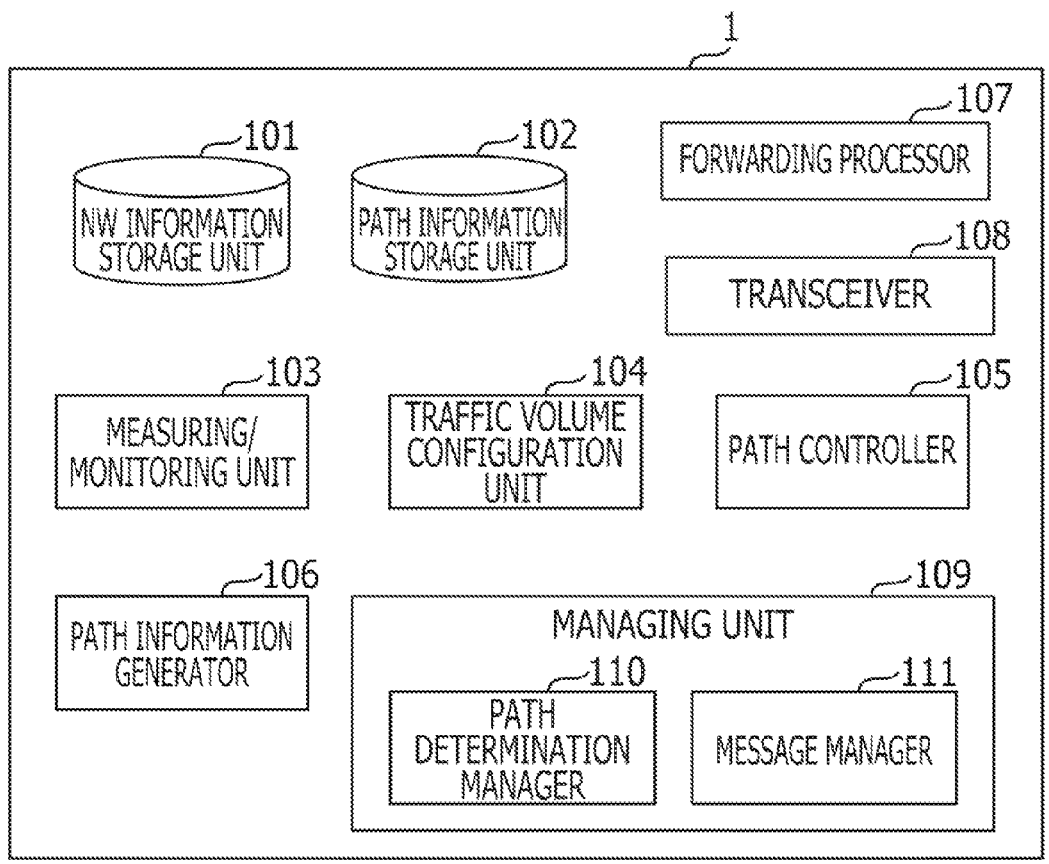
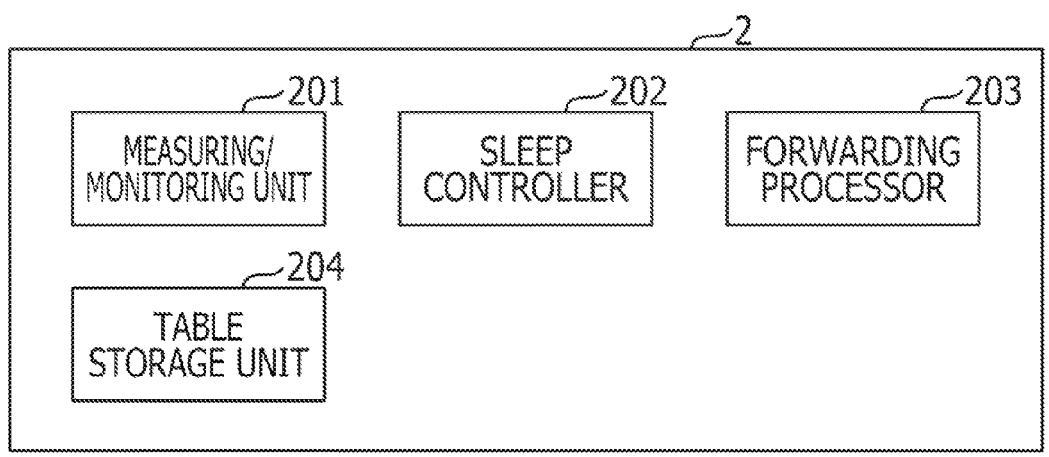

FIG. 8
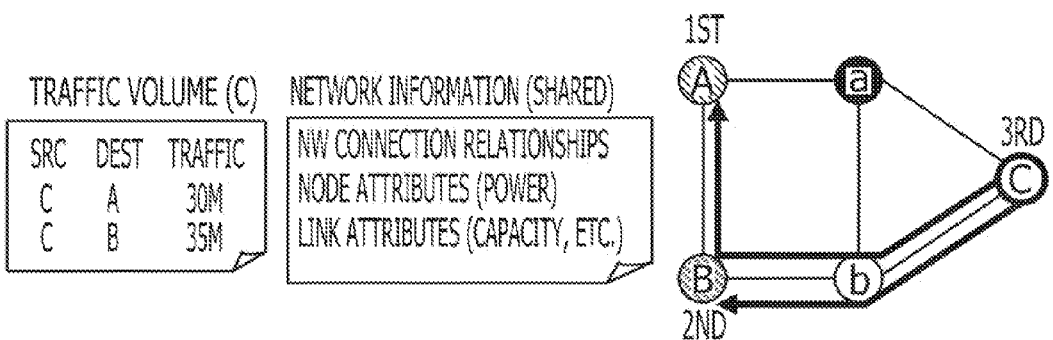
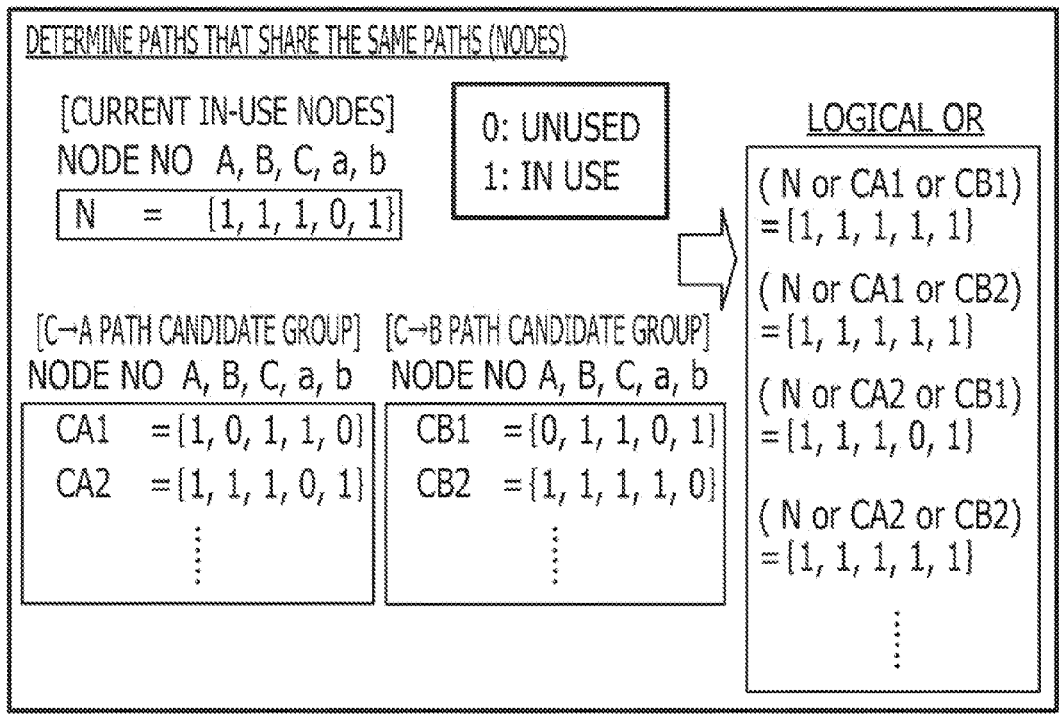

FIG. 9

| NODE ATTRIBUTES | NODE A | NODE B | NODE C | NODE a | NODE b |
|---|---|---|---|---|---|
| POWER CONSUMPTION (kW) | 10 | 10 | 20 | 15 | 10 |
| NODE USAGE (1/0) | 1 | 1 | 1 | 1 | 0 |

FIG. 10

| LINK ATTRIBUTES | LINK 1 | LINK 2 | LINK 3 | LINK 4 | ... | LINK 12 |
|---|---|---|---|---|---|---|
| DESTINATION NODE | NODE B | NODE A | NODE a | NODE A | ... | NODE b |
| POWER CONSUMPTION (kW) | 0.1 | 0.1 | 0.1 | 0.1 | ... | 0.1 |
| TRAFFIC VOLUME (Mbps) | 70 | 60 | 80 | 50 | ... | 50 |
| LINK CAP / PHYSICAL BANDWIDTH (Mbps) | 80/100 | 80/100 | 80/100 | 80/100 | ... | 80/100 |
| SURPLUS (Mbps) | 10 (80-70) | 20 (80-60) | 0 (80-80) | 30 (80-50) | ... | 30 (80-50) |
| LINK USAGE (0/1) | 1 | 1 | 1 | 1 | ... | 0 |
| LINK COST | $\delta$ (SMALL) | $\delta$ | $\delta$ | $\delta$ | ... | 10 |

FIG. 13
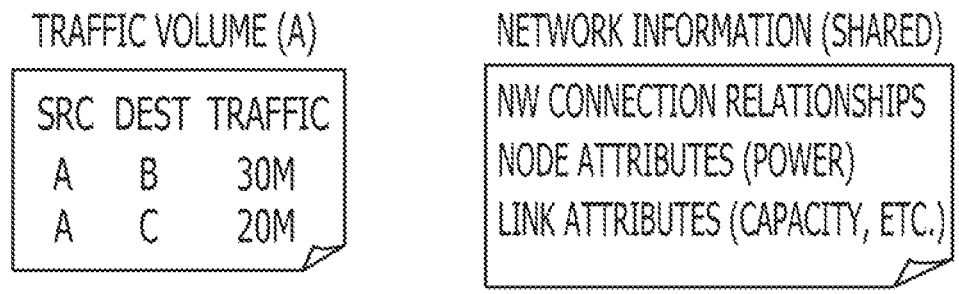
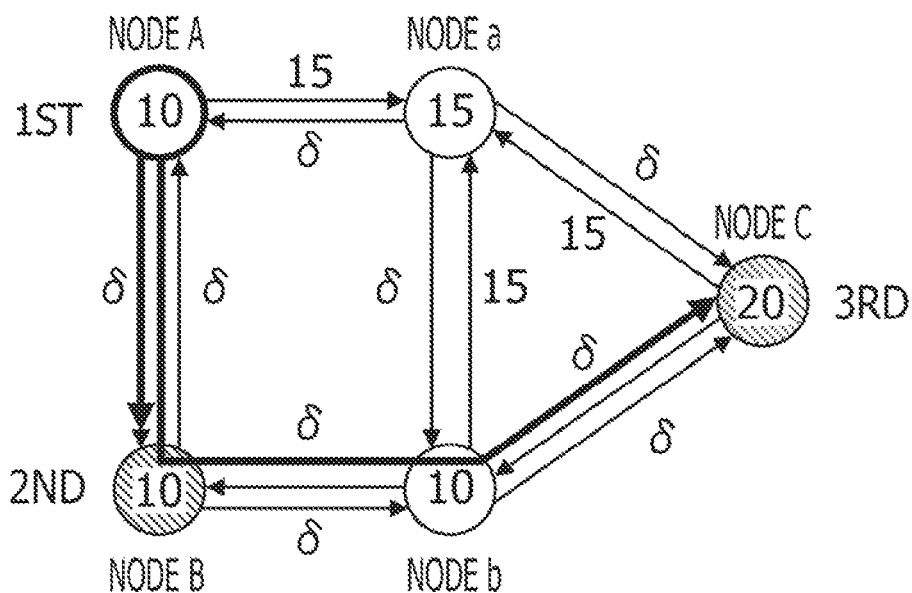

FIG. 14

| NODE ATTRIBUTES | NODE A | NODE B | NODE C | NODE a | NODE b |
|---|---|---|---|---|---|
| POWER CONSUMPTION (kW) | 10 | 10 | 20 | 15 | 10 |
| NODE USAGE (1/0) | 1 | 1 | 1 | 0 | 1 |

FIG. 15

| LINK ATTRIBUTES | LINK 1 | LINK 2 | LINK 3 | ... | LINK 12 |
|---|---|---|---|---|---|
| DESTINATION NODE | NODE B | NODE A | NODE a | ... | NODE b |
| POWER CONSUMPTION (kW) | 0.1 | 0.1 | 0.1 | ... | 0.1 |
| TRAFFIC VOLUME (Mbps) | 50 | 0 | 0 | ... | 0 |
| LINK CAP / PHYSICAL BANDWIDTH (Mbps) | 80/100 | 80/100 | 80/100 | ... | 80/100 |
| SURPLUS (Mbps) | 30 (80-50) | 80 | 80 | ... | 80 |
| LINK USAGE (0/1) | 1 | 0 | 0 | ... | 0 |
| LINK COST | $\delta$ (SMALL) | $\delta$ | 10 | ... | $\delta$ |

FIG. 16
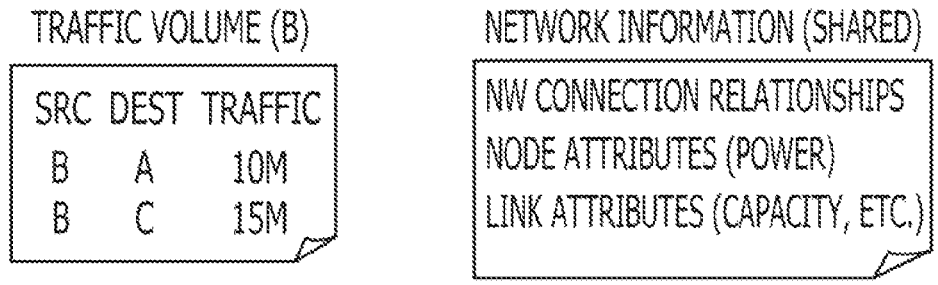
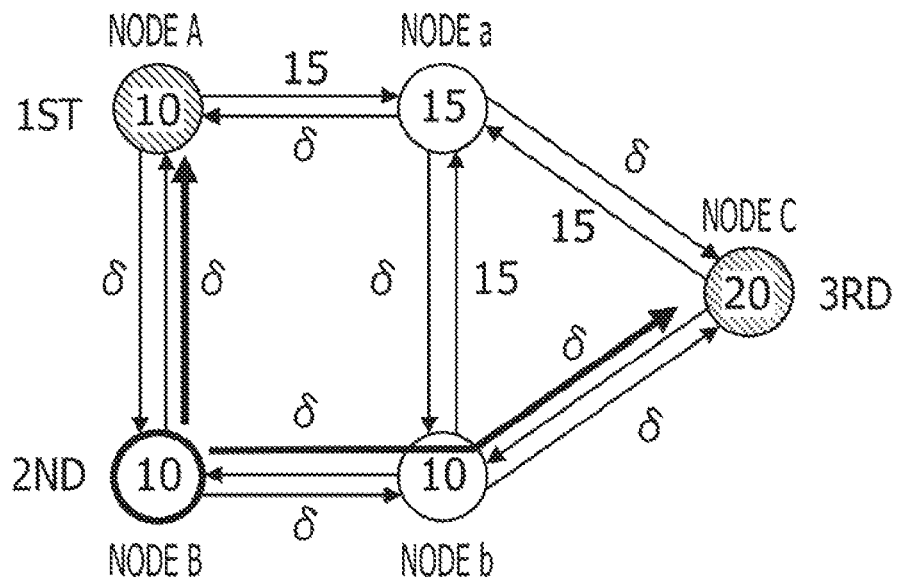

FIG. 17

| NODE ATTRIBUTES | NODE A | NODE B | NODE C | NODE a | NODE b |
|---|---|---|---|---|---|
| POWER CONSUMPTION (kW) | 10 | 10 | 20 | 15 | 10 |
| NODE USAGE (1/0) | 1 | 1 | 1 | 0 | 1 |

FIG. 18

| LINK ATTRIBUTES | LINK 1 | LINK 2 | LINK 3 | ... | LINK 12 |
|---|---|---|---|---|---|
| DESTINATION NODE | NODE B | NODE A | NODE a | ... | NODE b |
| POWER CONSUMPTION (kW) | 0.1 | 0.1 | 0.1 | ... | 0.1 |
| TRAFFIC VOLUME (Mbps) | 50 | 10 | 0 | ... | 0 |
| LINK CAP / PHYSICAL BANDWIDTH (Mbps) | 80/100 | 80/100 | 80/100 | ... | 80/100 |
| SURPLUS (Mbps) | 30 (80-50) | 70 (80-10) | 80 | ... | 80 |
| LINK USAGE (0/1) | 1 | 1 | 0 | ... | 0 |
| LINK COST | $\delta$ (SMALL) | $\delta$ | 10 | ... | $\delta$ |

FIG. 19
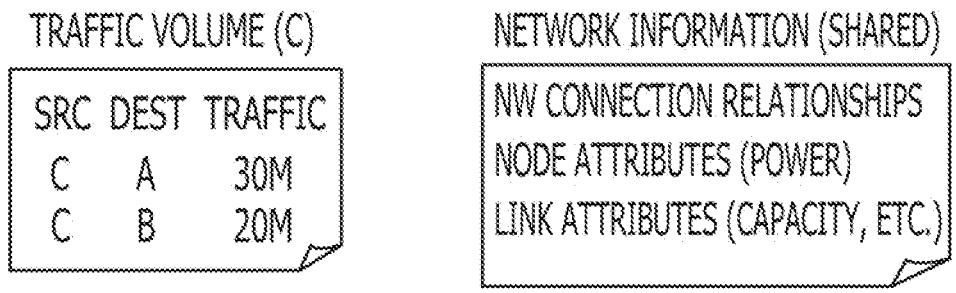
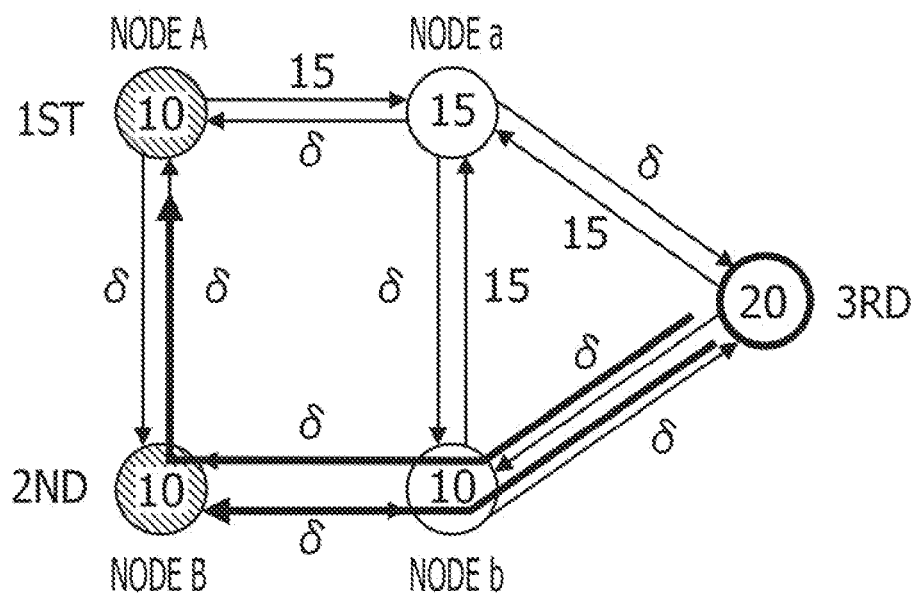

FIG. 20

| NODE ATTRIBUTES | NODE A | NODE B | NODE C | NODE a | NODE b |
|---|---|---|---|---|---|
| POWER CONSUMPTION (kW) | 10 | 10 | 20 | 15 | 10 |
| NODE USAGE (1/0) | 1 | 1 | 1 | 0 | 1 |

FIG. 21

| LINK ATTRIBUTES | LINK 1 | LINK 2 | LINK 3 | ... | LINK 12 |
|---|---|---|---|---|---|
| DESTINATION NODE | NODE B | NODE A | NODE a | ... | NODE b |
| POWER CONSUMPTION (kW) | 0.1 | 0.1 | 0.1 | ... | 0.1 |
| TRAFFIC VOLUME (Mbps) | 50 | 40 | 0 | ... | 50 |
| LINK CAP / PHYSICAL BANDWIDTH (Mbps) | 80/100 | 80/100 | 80/100 | ... | 80/100 |
| SURPLUS (Mbps) | 30 (80-50) | 40 (80-40) | 80 | ... | 30 (80-50) |
| LINK USAGE (0/1) | 1 | 1 | 0 | ... | 1 |
| LINK COST | $\delta$ (SMALL) | $\delta$ | 10 | ... | $\delta$ |

FIG. 28

| EDGE NODE ID (IP ADDRESS) | NEXT NODE ID |
|---|---|
| EDGE A (192. 168. *.1) | EDGE B (192. 168. *.2) |
| EDGE B (192. 168. *.2) | EDGE C (192. 168. *.3) |
| EDGE C (192. 168. *.3) | EDGE D (192. 168. *.4) |
| ⋮ | ⋮ |
| EDGE X (192. 168. *.n) | — |

FIG. 29

| EDGE NODE ID (IP ADDRESS) | NEXT NODE ID |
|---|---|
| EDGE A (192. 168. *.1) | EDGE B (192. 168. *.2) |
| EDGE B (192. 168. *.2) | EDGE C (192. 168. *.3) |
| EDGE C (192. 168. *.3) | EDGE D (192. 168. *.4) |
| ⋮ | ⋮ |
| EDGE X (192. 168. *.n) | EDGE A (192. 168. *.1) |

TRAFFIC VOLUME (A)

| SRC | DEST | TRAFFIC |
|-----|------|---------|
| A | B | 30M |
| A | C | 20M |

NETWORK INFORMATION (SHARED)

NW CONNECTION RELATIONSHIPS
NODE ATTRIBUTES (POWER)
LINK ATTRIBUTES (CAPACITY, ETC.)

DETERMINE PATHS THAT SHARE
THE SAME PATHS (NODES)

DETERMINATION RESULTS

PATH AB1   A→B
PATH AC2   A→B→b→C

|   | A | B | C | a | b |
|---|---|---|---|---|---|
| A |   | 50 |   |   |   |
| B |   |   |   |   | 20 |
| C |   |   |   |   |   |
| a |   |   |   |   |   |
| b |   |   | 20 |   |   |

TOKEN

| EDGE ID | NEXT EDGE ID |
|---------|--------------|
| EDGE A | EDGE B |
| EDGE B | EDGE C |
| EDGE C | — |

TRAFFIC VOLUME (B)

| SRC | DEST | TRAFFIC |
|---|---|---|
| B | A | 10M |
| B | C | 15M |

NETWORK INFORMATION (SHARED)

NW CONNECTION RELATIONSHIPS
NODE ATTRIBUTES (POWER)
LINK ATTRIBUTES (CAPACITY, ETC.)

DETERMINE PATHS THAT SHARE
THE SAME PATHS (NODES)

DETERMINATION RESULTS

PATH BA1  B→A
PATH BC1  B→b→C

|   | A | B | C | a | b |
|---|---|---|---|---|---|
| A |   | 50 |   |   |   |
| B | 10 |   |   |   | 35 |
| C |   |   |   |   |   |
| a |   |   |   |   |   |
| b |   |   | 35 |   |   |

TOKEN

| EDGE ID | NEXT EDGE ID |
|---|---|
| EDGE A | EDGE B |
| EDGE B | EDGE C |
| EDGE C | — |

TRAFFIC VOLUME (C)

| SRC | DEST | TRAFFIC |
|---|---|---|
| C | A | 30M |
| C | A | 35M |

NETWORK INFORMATION (SHARED)

NW CONNECTION RELATIONSHIPS
NODE ATTRIBUTES (POWER)
LINK ATTRIBUTES (CAPACITY, ETC.)

DETERMINE PATHS THAT SHARE
THE SAME PATHS (NODES)

DETERMINATION RESULTS

PATH CA2   C→b→B→A
PATH CB1   C→b→B

|   | A | B | C | a | b |
|---|---|---|---|---|---|
| A |   | 50 |   |   |   |
| B | 40 |   |   |   | 35 |
| C |   |   |   |   | 65 |
| a |   |   |   |   |   |
| b |   | 65 | 35 |   |   |

TOKEN

| EDGE ID | NEXT EDGE ID |
|---|---|
| EDGE A | EDGE B |
| EDGE B | EDGE C |
| EDGE C | — |

TRAFFIC VOLUME (C)

| SRC | DEST | TRAFFIC |
|---|---|---|
| C | A | 30M |
| C | A | 35M |

NETWORK INFORMATION (SHARED)

NW CONNECTION RELATIONSHIPS
NODE ATTRIBUTES (POWER)
LINK ATTRIBUTES (CAPACITY, ETC.)

DETERMINE PATHS THAT SHARE
THE SAME PATHS (NODES)

DETERMINATION RESULTS

PATH CA2   C→b→B→A
PATH CB1   C→b→B

|   | A | B | C | a | b |
|---|---|---|---|---|---|
| A |   | 50 |   |   |   |
| B | 40 |   |   |   | 35 |
| C |   |   |   |   | 65 |
| a |   |   |   |   |   |
| b |   | 65 | 35 |   |   |

TOKEN

| EDGE ID | NEXT EDGE ID |
|---|---|
| EDGE A | EDGE B |
| EDGE B | EDGE C |
| EDGE C | EDGE A |

FIG. 39
DEMAND LIST
| SRC | DEST | TRAFFIC |
|---|---|---|
| A | B | 35M |
| A | C | 20M |
| B | A | 10M |
| B | C | 15M |
| C | A | 30M |
| C | B | 35M |
SPECIFIED PATH DETERMINATION ORDER
| 1ST | A |
|---|---|
| 2ND | B |
| 3RD | C |
EDGE A
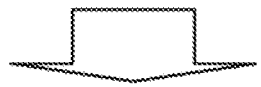
DEMAND LIST
| SRC | DEST | TRAFFIC |
|---|---|---|
| B | A | 10M |
| B | C | 15M |
| C | A | 30M |
| C | B | 35M |
SPECIFIED PATH DETERMINATION ORDER
| 1ST | A |
|---|---|
| 2ND | B |
| 3RD | C |
EDGE B
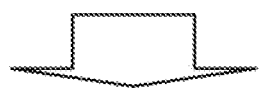
DEMAND LIST
| SRC | DEST | TRAFFIC |
|---|---|---|
| C | A | 30M |
| C | B | 35M |
SPECIFIED PATH DETERMINATION ORDER
| 1ST | A |
|---|---|
| 2ND | B |
| 3RD | C |
EDGE C

PATH CONTROL METHOD, COMMUNICATION SYSTEM, AND COMMUNICATION APPARATUS

CROSS-REFERENCE TO RELATED APPLICATIONS

This application is based upon and claims the benefit of priority of the prior Japanese Patent Application No. 2009-281893, filed on Dec. 11, 2009, the entire contents of which are incorporated herein by reference.

FIELD

Embodiments herein relate to a path control method, a communication system, and a communication apparatus.

BACKGROUND

Communication apparatus such as routers are devices for delivering data packets to a destination. In a network made up of a plurality of communication apparatus and a plurality of links, the communication apparatus work to forward received data according to its destination. When communicating data on the network, various path control systems have been proposed for cases when there exists multiple paths from the source apparatus to the destination apparatus. Such path control systems conduct path control to determine desired paths on the basis of evaluation standards.

For example, technology has been disclosed for a communication apparatus provided with dynamic voltage scaling (DVS) functions, wherein a cost value for each link is defined to be the sum of the power consumption by the communication apparatus at either ends of the link. The communication apparatus with DVS functions then calculates the path with the minimum link cost. In addition, there has been disclosed technology wherein an edge router collects statistical information and conducts path calculations.

Meanwhile, as the magnitude of communicated data has become increasingly vast, technologies are being researched for efficiently decreasing power consumption in individual apparatus on a network. For example, technology has been disclosed wherein communication apparatus not performing traffic processes are transitioned to a low power sleep mode, thereby curtailing system-wide power consumption.

SUMMARY

According to an aspect of the embodiment, a path control method for controlling paths among edge nodes on a network wherein a plurality of nodes, including relay nodes and multiple edge nodes, are connected via links, the method includes executing a process for determining paths in a specified plurality of edge nodes, wherein path information indicating the paths determined by an edge node that determined paths earlier is transmitted to an edge node that determines paths subsequently, and wherein each edge node that determines paths subsequently determines additional paths by prioritizing the use of paths indicated by the received path information, and conducting path control on the network by using the path information obtained as a result of paths being determined by the last edge node from among the specified plurality of edge nodes.

The object and advantages of the embodiment will be realized and attained by at least the elements, features, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a block diagram illustrating one example of functional configurations pertaining to edge nodes and relay nodes;

FIG. 8 illustrates one example of path determination by an edge node C;

FIG. 9 illustrates one example of node attributes;

FIG. 10 illustrates one example of link attributes;

FIG. 13 illustrates one example of path determination results by an edge node A;

FIG. 14 illustrates node attributes after path determination by an edge node A;

FIG. 15 illustrates link attributes after path determination by an edge node A;

FIG. 16 illustrates one example of path determination results by an edge node B;

FIG. 17 illustrates node attributes after path determination by an edge node B;

FIG. 18 illustrates link attributes after path determination by an edge node B;

FIG. 19 illustrates one example of path determination results by an edge node C;

FIG. 20 illustrates node attributes after path determination by an edge node C;

FIG. 21 illustrates link attributes after path determination by an edge node C;

FIG. 28 illustrates one example of the data structure of a token A;

FIG. 29 illustrates one example of the data structure of a token B;

FIG. 39 illustrates one example of a demand list.

DESCRIPTION OF EMBODIMENTS

Consider a system subject to path control wherein nodes not processing traffic are put into a low power sleep mode. The method for autonomous, distributed path determination by individual edge nodes as disclosed in Japanese Unexamined Patent Application Publication No. 2004-48330 will now be hypothesized for such a system.

Herein, a node refers to one element (such as a communication apparatus, computer, or hub, for example) including a network. Nodes may be one of the following types: edge nodes, which are positioned at the entrance of the given network or at the boundary between the given network and another network; or relay nodes, which are all nodes other than the edge nodes. In the Multi-Protocol Label Switching (MPLS) protocol and other mechanisms that realize dynamic path control, path determination is often conducted by individual edge nodes, with a link from a given edge node to another given edge node being treated as a single path. This is because system control is easier when path determination is conducted by path-terminating edge nodes, rather than by relay nodes.

Individual edge nodes conducting path determination in an autonomous, distributed manner may individually calculate paths to other edge nodes upon detecting a path control trigger based on traffic status, for example. In this case, the following problems exist.

Figure 1:
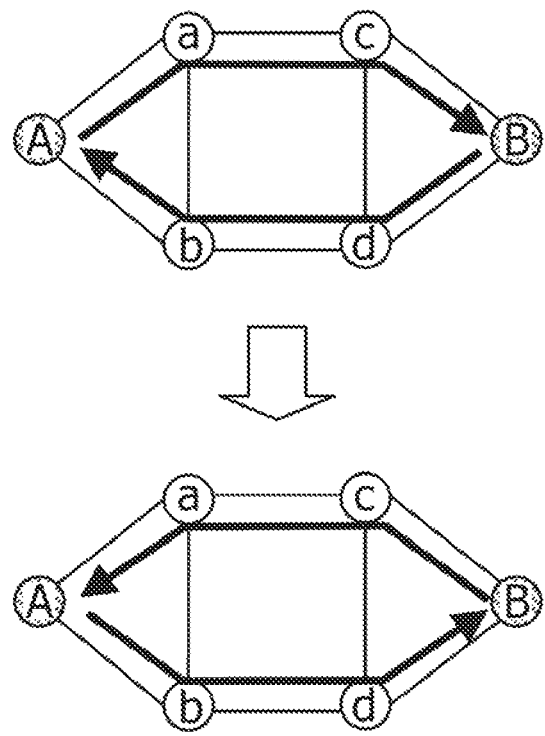
FIG. 1 illustrates problems with a hypothetical path determination method.

FIG. 1 explains problems with the hypothesized path determination method. The network illustrated in FIG. 1 is made up of an edge node A, an edge node B, relay nodes a to d, as well as respective links. In the example illustrated in FIG. 1, traffic is currently being forwarded from the edge node A to the relay node a, the relay node c, and the edge node B, in that order. Additionally, traffic is also being forwarded from the edge node B to the relay node d, the relay node b, and the edge node A, in that order.

Herein, the edge node A and the edge node B are taken to respectively conduct path determination. At the edge node A, it is determined that the relay node a and the relay node c may be put to sleep if traffic is directed to the relay node b and the relay node d. As a result, the path after path determination starts at the edge node A and goes to the relay node b, the relay node d, and the edge node B, in that order.

Meanwhile, at the edge node B, it is determined that the relay node b and the relay node d may be put to sleep if traffic is directed to the relay node c and the relay node a. As a result, the path after path determination starts at the edge node B and goes to the relay node c, the relay node a, and the edge node A, in that order.

There is thus a problem in that, if path determination is independently conducted at the individual edge nodes, then the paths between edge nodes on the network may not be consolidated in some cases, and the power consumed by the system may not be curtailed.

Consequently, it is desirable to provide technology that makes it easier for paths between edge nodes to be consolidated when determining paths.

A path control method in accordance with an embodiment is a method for controlling paths among edge nodes on a network wherein a plurality of nodes, including relay nodes and multiple edge nodes, are connected via links. The method includes: determining paths in a specified plurality of edge nodes, path information indicating the paths determined by an edge node that determines paths earlier is transmitted to an edge node that determines paths subsequently, and each edge node that determines paths subsequently determines additional paths by prioritizing the use of paths indicated by the path information; and conducting path control on the network by using the path information obtained as a result of paths being determined by the last edge node from among the specified plurality of edge nodes.

A communication system in accordance with another embodiment is configured to control paths on a network wherein a plurality of nodes are connected via links. The communication system includes one or more relay nodes, and a plurality of edge nodes. Each relay node includes a sleep control configured to put the relay node into a low-power state when the relay node is not processing traffic. Each edge node includes: a receiver configured to receive path information from other edge nodes, the path information indicates paths for forwarding data among respective edge nodes; a path controller configured to determine paths to other edge nodes while prioritizing the use of paths indicated by the received path information; and a transmitter configured to transmit path information to the next edge node, wherein the transmitted path information has been updated with the determined paths.

A communication apparatus in accordance with another embodiment is positioned at the boundary or entrance of a network, and is configured to communicate data with other communication apparatus positioned at the boundaries or entrances of other networks. The communication apparatus includes: a receiver configured to receive path information from the other communication apparatus, wherein the path information indicates paths for communicating data among respective communication apparatus; a path controller configured to determine paths to other communication apparatus while prioritizing the use of paths indicated by the received path information; and a transmitter configured to transmit path information to the next communication apparatus, wherein the transmitted path information has been updated with the determined paths.

According to an embodiment, paths between edge nodes are more easily consolidated when determining paths, thereby enabling power consumption inside the system to be curtailed.

Hereinafter, embodiments will be described with reference to the attached drawings.

Figure 2:
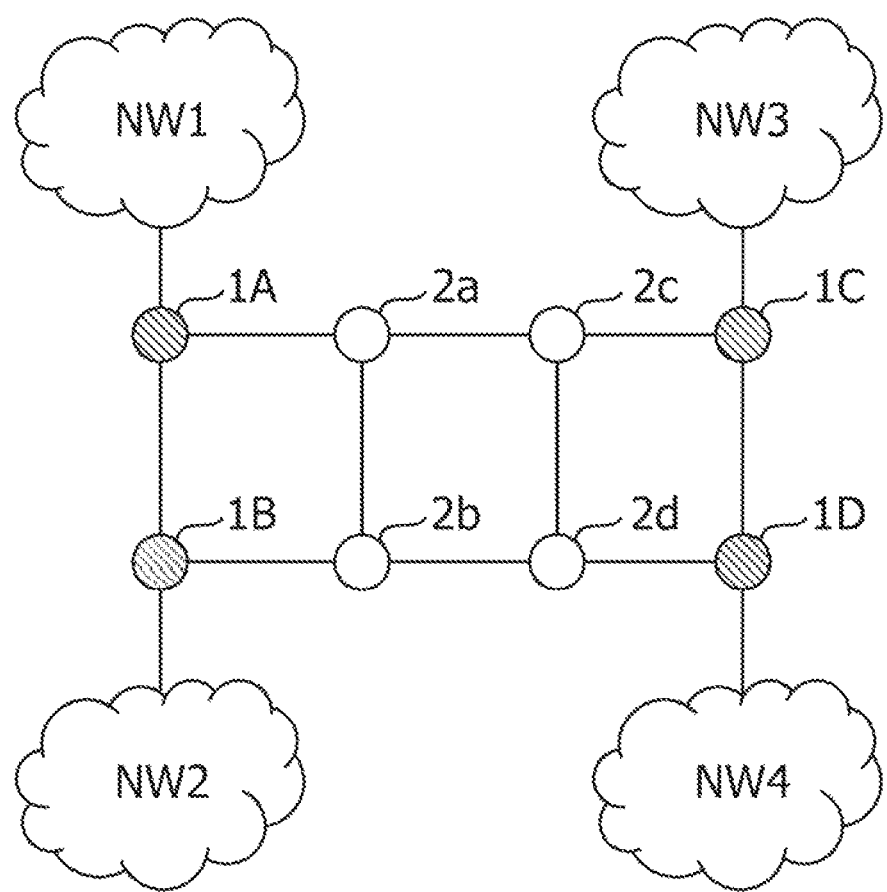
FIG. 2 is a block diagram illustrating one example of the overall configuration of a communication system in accordance with an embodiment.

FIG. 2 is a block diagram illustrating one example of the overall configuration of a communication system in accordance with an embodiment. As illustrated in FIG. 2, the communication system includes a plurality of nodes (herein, edge nodes 1A to 1D as well as relay nodes (also referred to as relays) 2a to 2d). The edge nodes and the relay nodes are coupled to each other by respective links as illustrated in FIG. 2. Hereinafter, the edge nodes 1A to 1D will be collectively referred to as the edge nodes 1, while the relay nodes 2a to 2d will be collectively referred to as the relay nodes 2. It should be appreciated that the number of edge nodes and the number of relay nodes are not limited to those in the example illustrated in FIG. 2. Furthermore, an embodiment is not limited to edge nodes, and may instead include administrative servers which act as a substitute for the functions of edge nodes.

The edge nodes 1 are nodes positioned at boundaries between respective networks, or nodes positioned at the entrance of a network. The edge nodes 1A to 1D illustrated in FIG. 2 respectively connect to networks (NWs) 1 to 4. The individual networks may be respectively managed by different operators and with differing protocols, for example.

In the network illustrated in FIG. 2, the relay nodes 2 that are not processing traffic may be transitioned to sleep mode. Herein, sleep mode indicates the transition from a state of normal operation to a state of reduced power usage. The edge node 1A measures and monitors traffic volume with respect to the other edge nodes 1B to 1D. The other edge nodes 1B to 1D likewise measure and monitor traffic volume with respect to the edge node 1A and the other edge nodes.

The edge nodes 1 re-determine paths to each edge node upon detecting a specified trigger (such as when the amount of increase or decrease in the traffic volume being monitored has reached a specified threshold value, for example). The trigger is not limited to the above, however, and may also be set to a parameter stipulating that the traffic behavior should meet specified conditions, or some other parameter. Once the trigger is detected, each edge node determines paths such that a greater number of nodes in sleep mode (hereinafter also referred to as sleep nodes) may exist on the network. Moreover, specified constraint parameters may also be set at this point, with the paths being determined within the bounds of the constraint parameters. In so doing, the number of system-wide active nodes may be decreased (preferably minimized), thereby curtailing power consumption.

Figure 3:
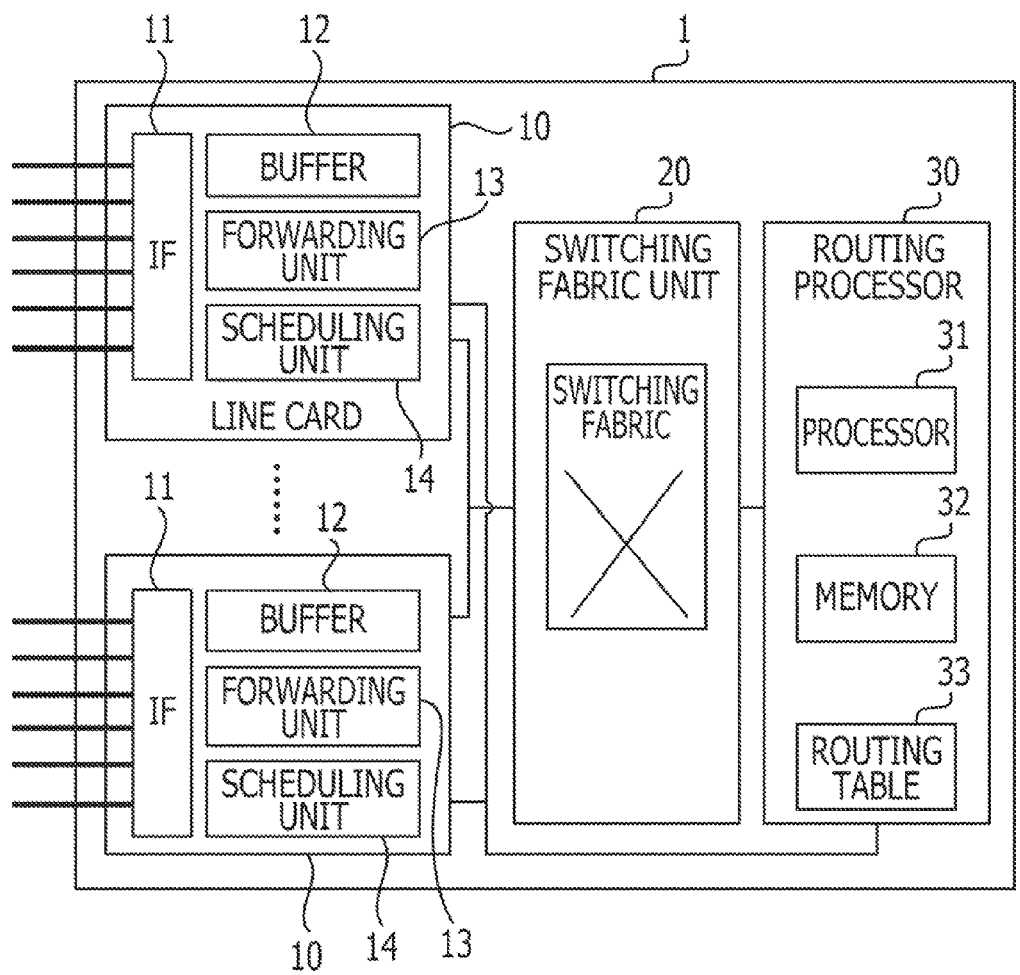
FIG. 3 is a block diagram illustrating one example of a hardware configuration pertaining to edge nodes.

The hardware configuration of the edge nodes 1 will now be described. FIG. 3 is a block diagram illustrating one example of a hardware configuration pertaining to the edge nodes 1. As illustrated in FIG. 3, an edge node 1 includes line cards 10, a switching fabric 20, and a routing processor 30.

Line cards 10 may include a transmitter and the receiver and may be realized by a transceiver interface module. In addition, the routing processor 30 may include a path controller and may be executed in hardware by an integrated logic circuit such as an application-specific integrated circuit (ASIC) or a field-programmable gate array (FPGA), or alternatively, realized by a digital signal processor (DSP).

Each line card 10 includes an interface (IF) 11, a buffer 12, a forwarding unit 13, and a scheduling unit 14. The buffer 12 temporarily stores packets acquired from the IF 11. The forwarding unit 13 reads header information from the packets stored in the buffer 12, and outputs the packets to the switching fabric 20. The scheduling unit 14 takes packets acquired from the switching fabric 20, and by use of scheduling functions, outputs the packets to their destinations at appropriate timings via the IF 11.

The switching fabric 20 schedules transmission such that packets sent from the line cards 10 do not collide, and outputs packets by selecting an appropriate line card 10 from header information in the packets.

The routing processor 30 includes a processor 31, memory 32, and a routing table 33. The processor 31 controls protocol processes for packet transmission, and also manages the routing table 33 and protocol information in the memory 32. The memory 32 stores protocol information to process protocols, as well as other information. The routing table 33 is information regarding the delivery destinations of packets held by the router or client.

Herein, the hardware configuration of the relay nodes 2 may be substantially similar to that of the edge nodes 1.

The functional configuration of the edge nodes 1 and the relay nodes 2 will now be described. FIG. 4 is a block diagram illustrating one example of functional configurations pertaining to edge nodes and relay nodes. First, the functions of the edge nodes 1 will be described.

Each edge node 1 includes a network (NW) information storage unit 101, a path information storage unit 102, a measuring/monitoring unit 103, a traffic volume configuration unit 104, a path controller 105, a path information generator 106, a forwarding processor 107, a transceiver 108, and a managing unit 109. The NW information storage unit 101 and the path information storage unit 102 may be realized by the memory 32 illustrated in FIG. 3, or by separate memory. The other functions may be realized as the result of processes executed by the processor 31.

The NW information storage unit 101 stores static information regarding node connection relationships, node attribute values (such as power consumption ratings), and link attribute values (such as bandwidth ratings). The path information storage unit 102 stores path information acquired from other edge nodes. Such path information may be information that expresses paths between respective edge nodes, and includes information expressing the traffic volume on respective paths.

The measuring/monitoring unit 103 measures the amount of traffic (i.e., the traffic volume) between the particular edge node where the measuring/monitoring unit 103 is provided (hereinafter also referred to as current edge node, herein taken to be 1A), and the other edge nodes (hereinafter referred to as the other edge nodes, herein taken to be 1B, 1C, and 1D). By measuring the respective traffic volume, the measuring/monitoring unit 103 detects triggers for reevaluating paths and bandwidths. Such triggers will now be described with the use of FIG. 5.

Figure 5:
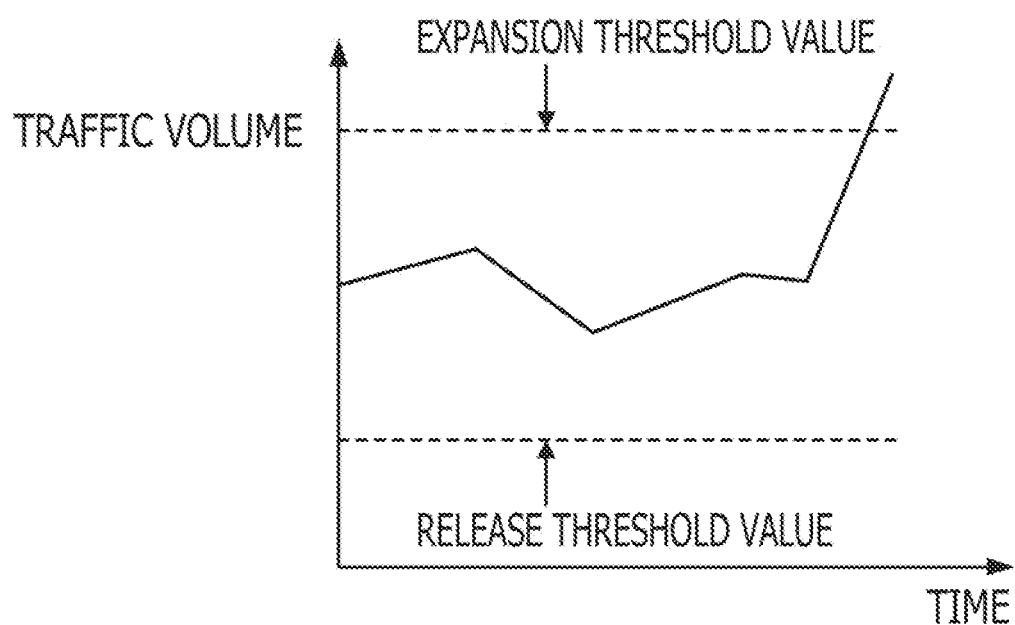
FIG. 5 illustrates path control triggers.

FIG. 5 explains path control triggers. In the example illustrated in FIG. 5, a measuring/monitoring unit 103 detects a trigger when path quality values (such as measured traffic volume, delays, or losses) become equal to or greater than an expansion threshold value, or less than or equal to a release threshold value. For example, an edge node 1 may determine to conduct path control when the traffic volume or other path quality value becomes equal to or greater than an expansion threshold value, or less than or equal to a release threshold value.

Returning now to FIG. 4, the traffic volume configuration unit 104 sets a traffic volume for each path on the basis of traffic volume measured by the measuring/monitoring unit 103. These set traffic volume are used to re-determine paths between edge nodes. The traffic volume configuration unit 104 then outputs the set traffic volume to the path controller 105.

The path controller 105 determines paths to other edge nodes with respect to the traffic volume acquired from the traffic volume configuration unit 104. More specifically, the path controller 105 takes NW information stored in the NW information storage unit 101, as well as path information acquired from other edge nodes, and uses this information as a basis for determining paths such that evaluation metrics are enhanced. Path determination will be later described in detail.

From the results determined by the path controller 105, the path information generator 106 generates path information expressing paths to other edge nodes. The path information may also include traffic volume for the paths.

The forwarding processor 107 controls how packets are forwarded by writing information to packet headers. The information written to packet headers is node-related information (such as node numbers, for example) for the nodes included along paths that are based on the path information generated by the path information generator 106. The transceiver 108 controls the sending and receiving of packets and control messages.

The managing unit 109 includes a path determination manager 110 and a message manager 111. The path determination manager 110 performs a control causing the path controller 105 to determine paths in the case where path information is acquired from other edge nodes. The message manager 111 manages control messages exchanged among edge nodes in order to control the order in which path information is sent.

The functional configuration of the relay nodes 2 will now be described. Each relay node 2 includes a measuring/monitoring unit 201, a sleep controller 202, a forwarding processor 203, and a table storage unit 204. The relay nodes 2 may also include other typical functions. The measuring/monitoring unit 201 and the forwarding processor 203 have functions that may be respectively substantially similar to those of the measuring/monitoring unit 103 and the forwarding processor 107 in the edge nodes 1.

The sleep controller 202 monitors traffic volume from the measuring/monitoring unit 201, and autonomously enters a low-power sleep mode when the amount of traffic being processed by the current node becomes 0. While in sleep mode, the sleep controller 202 causes the node to transition to a normal wake state when a traffic processing request is received.

The table storage unit 204 stores a routing table that expresses relationships with other nodes and links. Basically, the relay nodes 2 perform the function of forwarding a received packet to a forwarding destination node contained in the header or other part of the packet.

When determining paths, if one or more sleep nodes exist within the network, then the path controller 105 determines paths by prioritizing the use of paths that do not route through those sleep nodes. Hereinafter, exemplary path control processes executed by each edge node in a communication system will be described.

Figure 6:
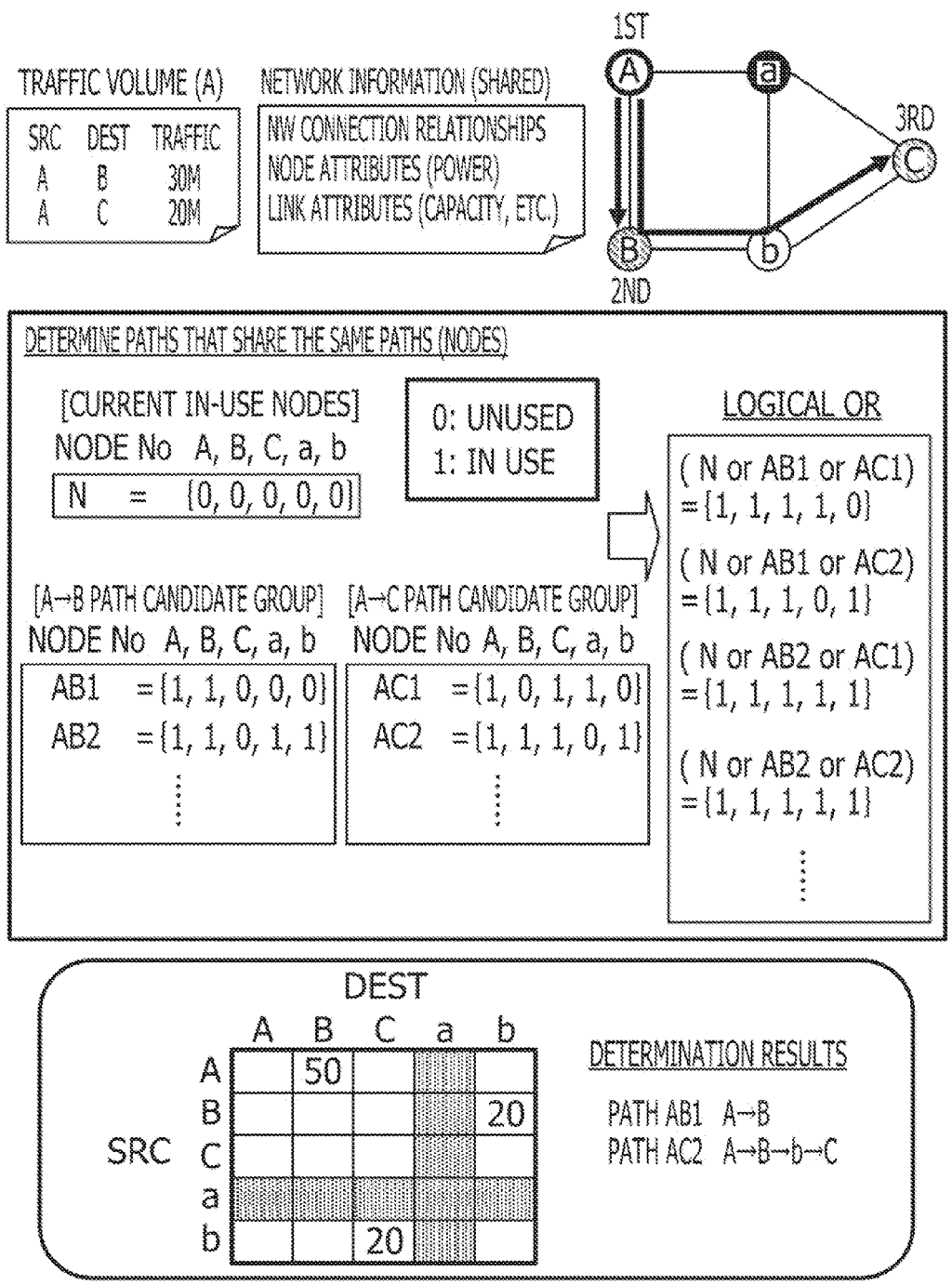
FIG. 6 illustrates one example of path determination by an edge node A that determines paths first.

The exemplary path control process described hereinafter is an example of simply determining paths that do not route through sleep nodes. The specifics of this exemplary process 1 will be described with the use of FIGS. 6 to 8. FIG. 6 illustrates one example of path determination by an edge node A that determines paths first. The network illustrated in FIG. 6 is formed by an edge node A, an edge node B, an edge node C, a relay node a, a relay node b, and respective links therebetween. Path control is herein conducted by the individual edge nodes in the following order: edge node A, edge node B, edge node C. This order may also be set in each edge node in advance.

Herein, it is assumed that a trigger for path control has been detected by one of the edge nodes. The edge node detecting the trigger broadcasts a start notification that initiates path control by the other edge nodes. The edge node A is set as 1 in the path control order, and thus upon receiving the broadcast (if another edge node detected the trigger) or transmitting the broadcast (if the edge node A itself detected the trigger), the edge node A conducts path determination first. Having received a broadcast start notification or broadcasted a start notification, the other edge nodes forward traffic along the paths currently set until reaching their respective turns in the path determination order.

Start notifications may also be issued for other reasons. For example, one reason is to prohibit other edge routers from originating path reevaluation and suddenly start determining paths. Another reason is to instruct the first edge router in the path determination order to start calculating paths.

In the example illustrated in FIG. 6, the traffic set by the traffic volume configuration unit 104 is 30 megabits per second (Mbps) from the edge node A to the edge node B, and 20 megabits per second (Mbps) from the edge node A to the edge node C. The units of traffic volume may also be in gigabits per second (Gbps). In addition, each edge node stores NW information, such as node attribute values and link attribute values.

In FIG. 6, the node in bold represents the edge node conducting path determination, the hatched nodes represent edge nodes, and the black node represents a sleep node. Subsequent drawings are similarly marked.

When determining paths, the path controller 105 uses the nodes currently in use to determine paths among the edge nodes. Herein, current node usage conditions are expressed as Usage conditions={A, B, C, a, b} with unused nodes being 0, and in-use nodes being 1. In the edge node that determines paths first, the paths have been reset, thus giving

N={0,0,0,0,0} since all nodes are unused. Herein, N represents the current in-use nodes.

Next, the following plurality of paths are considered as paths from the edge node A to the edge node B. AB1 to AB3 express the path number.

AB1={1,1,0,0,0}
AB2={1,1,0,1,1}
AB3={1,1,1,1,1}

For example, the path AB1 expresses a path from the edge node A to the edge node B. The path AB2 expresses a path from the edge node A, to the relay node a, to the relay node b, to the edge node B.

Next, the following plurality of paths are considered as paths from the edge node A to the edge node C. AC1 to AC4 express the path number.

AC1={1,0,1,1,0}
AC2={1,1,1,0,1}
AC3={1,0,1,1,1}
AC4={1,1,1,1,1}

For example, the path AC1 expresses a path from the edge node A, to the relay node a, to the edge node C. The path AC2 expresses a path from the edge node A, to the edge node B, to the relay node b, to the edge node C.

Next, the path controller 105 conducts logical addition (i.e., OR operations) on all combinations of the current in-use nodes N, the paths AB, and the paths AC.

(N or AB1 or AC1)={1,1,1,1,0}
(N or AB1 or AC2)={1,1,1,0,1}
(N or AB2 or AC1)={1,1,1,1,1} . . . .

From the results of the logical OR operations, the path controller 105 selects the combination with the fewest number of 1s. In the example illustrated in FIG. 6, the path controller 105 may select {AB1,AC1} or {AB1,AC2}. When making the selection, the path controller 105 may also reference information on the magnitude of power consumption in each node, and prioritize the inclusion of nodes with low power consumption in the paths to be selected. For example, if the relay node a exhibits greater power consumption than the relay node b, then power consumption is less along the paths {AB1,AC2} that do not route through the relay node a, and thus {AB1,AC2} are selected.

The path information generator 106 generates path information expressing the paths determined by the path controller 105. For example, the path information generator 106 may generate information expressing the determination results illustrated in the lower part of FIG. 6. In the path information illustrated in the lower part of FIG. 6, the vertical axis represents the forwarding source (Src), the horizontal axis represents the forwarding destination (Dest), and numbers represent traffic volume. For example, the amount of traffic from the edge node A to the edge node B is 50 Mbps (30 Mbps for AB plus 20 Mbps for AC, according to the Traffic volume (A) illustrated in FIG. 6). Since the relay node a is unused, the relay node a becomes a sleep node.

The edge node A inserts the determined path information into the data section of a packet, and transmits the packet to the edge node B, which determines paths subsequently.

Figure 7:
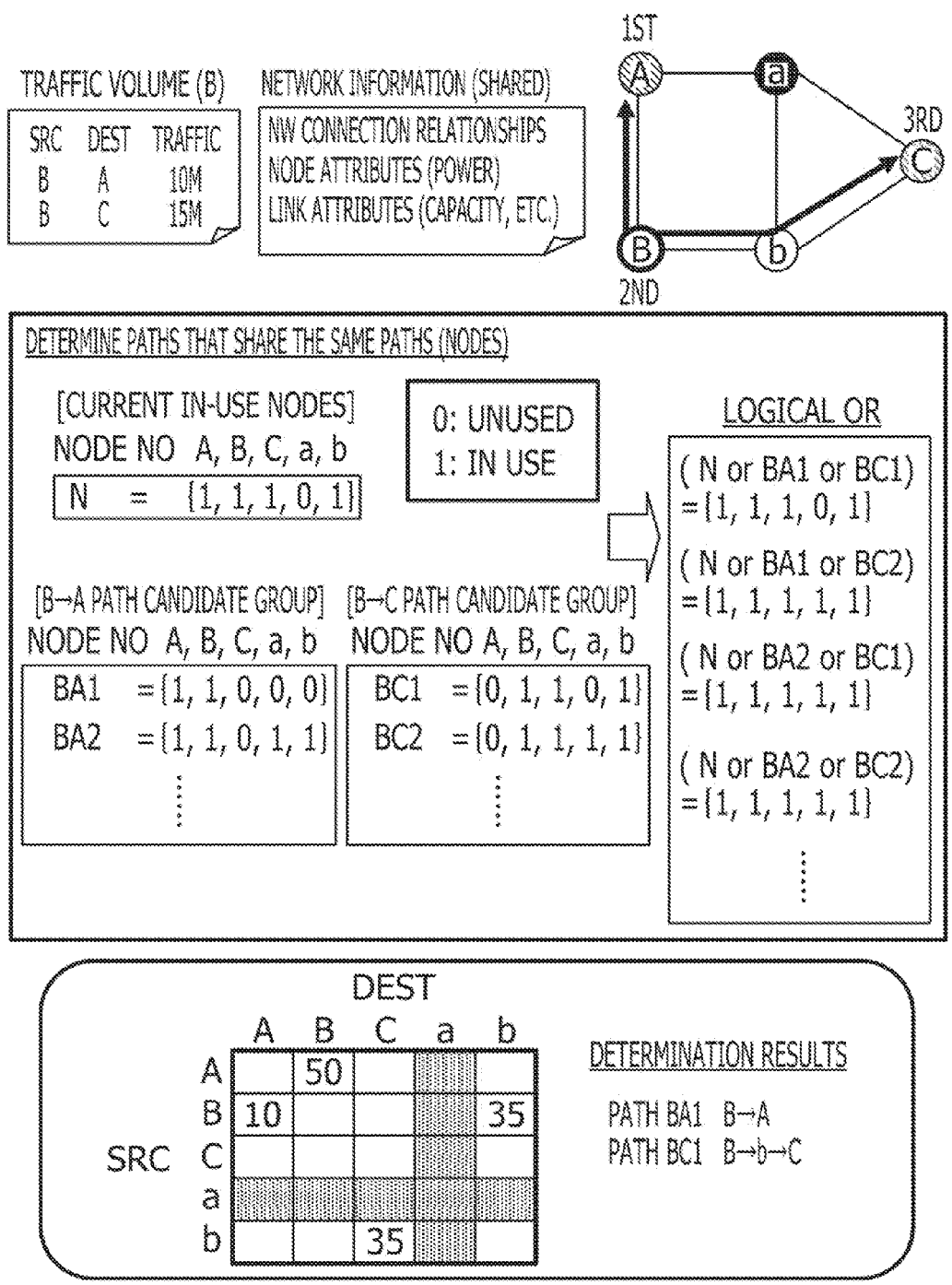
FIG. 7 illustrates one example of path determination by an edge node B.

FIG. 7 illustrates one example of path determination by an edge node B. Upon receiving path information from the edge node A, the edge node B determines paths to the other edge nodes. More specifically, the edge node B first takes the path information that was contained in the packet received from the edge node A, stores the path information in the path information storage unit 102, and sets the current in-use nodes N.

N={1,1,1,0,1}

The N illustrated in FIG. 7 may be substantially the same as the result of the logical OR operation among N, AB1, and AC2 illustrated in FIG. 6.

Next, the following plurality of paths are considered as paths from the edge node B to the edge node A. BA1 to BA3 express the path number.

BA1={1,1,0,0,0}
BA2={1,1,0,1,1}
BA3={1,1,1,1,1}

For example, the path BA1 expresses a path from the edge node A to the edge node B. The path BA2 expresses a path from the edge node B, to the relay node b, to the relay node a, to the edge node A.

Next, the following plurality of paths are considered as paths from the edge node B to the edge node C. BC1 to BC4 express the path number.

BC1={0,1,1,0,1}
BC2={0,1,1,1,1}
BC3={1,1,1,1,0}
BC4={1,1,1,1,1}

For example, the path BC1 expresses a path from the edge node B, to the relay node b, to the edge node C. The path BC2 expresses a path from the edge node B, to the relay node b, to the relay node a, to the edge node C.

Next, the path controller 105 conducts logical addition (i.e., OR operations) on all combinations of the current in-use nodes N, the paths BA, and the paths BC.

(N or BA1 or BC1)={1,1,1,0,1}
(N or BA1 or BC2)={1,1,1,1,1}
(N or BA2 or BC1)={1,1,1,1,1}

From the results of the logical OR operations, the path controller 105 selects the combination with the fewest number of 1s. In the example illustrated in FIG. 7, the path controller 105 selects {BA1,BC1}.

Using the paths determined by the path controller 105, the path information generator 106 updates the path information stored in the path information storage unit 102. For example, the path information generator 106 may generate information expressing the determination results illustrated in the lower part of FIG. 7. The path information illustrated in the lower part of FIG. 7 is path information that has been acquired from the edge node A and then updated using the paths determined by the edge node B.

For example, the amount of traffic from the edge node B to the relay node b is 35 Mbps (15 Mbps for BC according to the Traffic volume (B) illustrated in FIG. 7, plus 20 Mbps for Bb as illustrated in the lower part of FIG. 6). Since the relay node a is unused, the relay node a stays in sleep mode.

The edge node B inserts the updated path information into the data section of a packet, and transmits the packet to the edge node C, which determines paths subsequently.

FIG. 8 illustrates one example of path determination by an edge node C. Upon receiving path information from the edge node B, the edge node C determines paths to the other edge nodes. More specifically, the edge node C first takes the path information that was included in the packet received from the edge node B, stores the path information in the path information storage unit 102, and sets the current in-use nodes N.

N={1,1,1,0,1}

The N illustrated in FIG. 8 may be substantially the same as the result of the logical OR operation among N, BA1, and BC2 illustrated in FIG. 7.

Next, the following plurality of paths are considered as paths from the edge node C to the edge node A. CA1 to CA4 express the path number.

CA1={1,0,1,1,0}
CA2={1,1,1,0,1}
CA3={1,0,1,1,1}
CA4={1,1,1,1,1}

For example, the path CA1 expresses a path from the edge node C, to the relay node a, to the edge node A. The path CA2 expresses a path from the edge node C, to the relay node b, to the edge node B, to the edge node A.

Next, the following plurality of paths are considered as paths from the edge node C to the edge node B. CB1 to CB3 express the path number.

CB1={0,1,1,0,1}
CB2={1,1,1,1,0}
CB3={0,1,1,1,1}

For example, the path CB1 expresses a path from the edge node C, to the relay node b, to the edge node B. The path CB2 expresses a path from the edge node C, to the relay node a, to the edge node A, to the edge node B.

Next, the path controller 105 conducts logical addition (i.e., OR operations) on all combinations of the current in-use nodes N, the paths CA, and the paths CB.

(N or CA1 or CB1)={1,1,1,1,1}
(N or CA1 or CB2)={1,1,1,1,1}
(N or CA2 or CB1)={1,1,1,0,1} . . . .

From the results of the logical OR operations, the path controller 105 selects the combination with the fewest number of 1s. In the example illustrated in FIG. 8, the path controller 105 selects {CA2,CB1}.

Using the paths determined by the path controller 105, the path information generator 106 updates the path information stored in the path information storage unit 102. For example, the path information generator 106 may generate information expressing the determination results illustrated in the lower part of FIG. 8. The path information illustrated in the lower part of FIG. 8 is path information that has been acquired from the edge node B and then updated using the paths determined by the edge node C. For example, the amount of traffic from the edge node C to the relay node b is 65 Mbps (30 Mbps for CA plus 35 Mbps for CB according to the Traffic volume (C) illustrated in FIG. 8). Since the relay node a is unused, the relay node a stays in sleep mode.

Since the edge node C is the last node to determine paths, the edge node C transmits the final path determination results (i.e., the path information in the lower part of FIG. 8) to the other edge nodes. The final path information illustrated in the lower part of FIG. 8 is information that reflects the paths determined by all edge nodes. In so doing, the other edge nodes are able to forward traffic using paths that do not route through sleep nodes on the network, and with respect to the traffic volume set by the traffic volume configuration unit 104.

Herein, the path controller 105 may also be configured to divide and forward traffic along multiple paths if the traffic volume along the determined paths exceed link bandwidth limits in the NW information. However, even in the case of dividing and forwarding traffic along multiple paths, the path controller 105 may be configured to avoid forwarding traffic through sleep nodes whenever possible. In other words, the path controller 105 may be configured to conduct the path control described above while remaining within bounds that satisfy constraint parameters and quality parameters, such as those related to link bandwidth limits and numbers of hops.

Also, when transmitting path information to the next edge node, each edge node may transmit along a path that does not route through sleep nodes. For example, when transmitting path information from the edge node C to the edge node A in the network illustrated in FIG. 8, the following path may be used: from the edge node C, to the relay node b, to the edge node B, to the edge node A.

The exemplary path control process described hereinafter is an example of determining paths that do not route through sleep nodes, while also taking link costs into account. The specifics of this exemplary process 2 will be described with the use of FIGS. 9 to 21. The network used herein to describe the exemplary process 2 may be substantially the same as the network that was used to describe the exemplary process 1. In the exemplary process 2, features such as the broadcast notification and the path determination order are similar to those of the exemplary process 1.

FIG. 9 illustrates one example of node attributes. Information regarding node attributes may be stored in the NW information storage unit 101. In the node attributes information, values are registered in the following fields for each node: "Power consumption (kW)", and "Node usage (1: in-use, 0: unused)".

The "Power consumption" field expresses the amount of power consumed by a node while in the wake state (this value may be the minimum amount of power consumption in the wake state, for example). The "Node usage" field takes a value of 1 if the corresponding node is being used on a path for forwarding traffic, and a value of 0 if that node is unused. In other words, nodes whose "Node usage" field includes a value of "0" may become sleep nodes.

FIG. 10 illustrates one example of link attributes. Information regarding link attributes may be stored in the NW information storage unit 101. In the link attributes information, link attributes are registered for each connecting link between two nodes. For example, link attribute values may be registered in the following fields for each link: "Destination node", "Power consumption (kW)", "Traffic volume (Mbps)", "Link cap/Physical bandwidth (Mbps)", "Surplus (Mbps)", "Link usage (1: in-use, 0: unused)", and "Link cost". Herein, it is assumed that the value of each parameter has been determined by the operator.

The "Destination node" field expresses the node number (node A to node b) of the downstream node on each link. Herein, each link may be conceived as a separate element, even in cases where respective link connections are made via a single physical resource (i.e., a cable). Consequently, in order to distinguish between upstream and downstream links, separate link numbers are given, and the destination node is defined.

The "Power consumption" field expresses the amount of power consumption occurring in the link itself as a result of that link being used (this value may be the power consumed by the physical resource, for example). The "Traffic volume" field expresses the total of all flows set for paths routing through that link.

The "Link cap" field expresses the upper limit on the total amount of traffic that may be set to flow through that link. The "Physical bandwidth" field expresses the bandwidth capacity of the link's physical resource. The "Surplus" field expresses the available bandwidth that remains after subtracting the traffic volume from the link cap value. In other words, the surplus is the amount of additional traffic that may be set in flows along paths routing through that link. The "Link usage" field takes a value of 0 when no flow paths are set to route through that link, and a value of 1 when at least one flow path is set.

The "Link cost" field expresses the power consumption defined in the node attributes for the destination node. In other words, in the exemplary process 2, the "Link cost" is the amount of power consumed by respective nodes in order to realize individual traffic flows.

As described later, the link cost $\delta$ illustrated in FIG. 10 may be a constant written to the "Link cost" field as a substitute for the power consumption of the destination node. The value of $\delta$ is significantly smaller than the original power consumption. The link cost $\delta$ may be written over the actual link cost of a link ending at an in-use node. The calculations for computing the total link cost are conducted by using the links as a basis, and thus link costs are defined as illustrated in FIG. 11.

Figure 11:
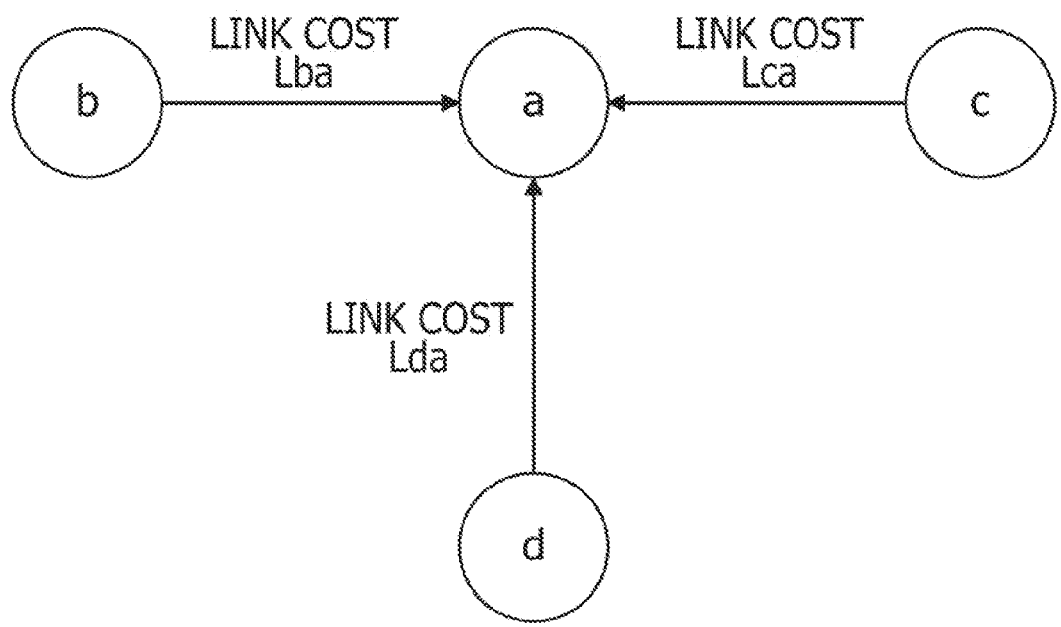
FIG. 11 illustrates link costs.

FIG. 11 illustrates link costs. In the example illustrated in FIG. 11, a given node a has incoming links from other nodes b to d. The combined link costs Lba, Lca, and Lda for all of these links becomes the value in the "Power consumption" field for the node a.

Figure 12:
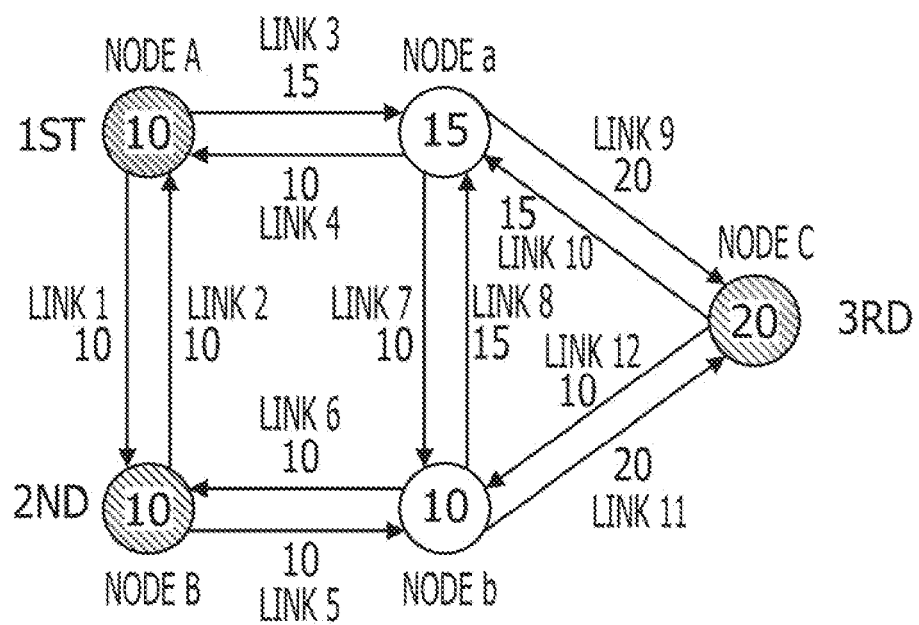
FIG. 12 illustrates link costs on the network in an exemplary process 2.

FIG. 12 illustrates link costs on the network in the exemplary process 2. The number appearing inside each circle representing a node in FIG. 12 expresses the power consumption for that node. Each arrow represents a link, and the number beside each arrow expresses the link cost for that link. Each link has been given a link name (link 1 to link 12).

An example will now be described wherein paths are determined by an edge node A, an edge node B, and an edge node C, in that order, and in a network having the link costs illustrated in FIG. 12. In the edge node A that determines paths first, the path controller 105 acquires the traffic volume set by the traffic volume configuration unit 104. Herein, it is assumed that the traffic from the edge node A to the edge node B is 30 Mbps, and that the traffic from the edge node A to the edge node C is 20 Mbps.

From among possible paths from the edge node A to the edge node B, the path controller 105 selects the path with the lowest total link cost. In the example illustrated in FIG. 12, the path leading directly from the edge node A to the edge node B has a link cost of 10, and its total link cost is less than the other, indirect paths. Thus, the edge node A and the edge node B become in-use nodes, and the link costs of the links ending at the edge node A and the edge node B are overwritten with the value $\delta$.

Next, the path controller 105 calculates the total link costs of the paths from the edge node A to the edge node C. For example, the path leading from the edge node A, to the relay node a, to the edge node C has a total link cost of 15+20=35. Meanwhile, the path leading from the edge node A, to the edge node B, to the relay node b, to the edge node C has a total link cost of δ+10+20=30+δ. Since δ is significantly small, the relationship 30+δ<35 holds.

Consequently, the path AC with the lowest link cost is the path leading from the edge node A, to the edge node B, to the relay node b, to the edge node C, and this path is determined to be the desired path. At this point, the link costs of the links ending at the relay node b and the edge node C are overwritten with the value δ.

FIG. 13 illustrates one example of path determination results by an edge node A. As described above, the link costs of the links ending at the edge nodes A to C and the relay node b have been overwritten with the value δ. In so doing, it becomes easier to utilize the nodes that are already in-use. The lower part of FIG. 13 illustrates path information after path determination by the path controller 105.

FIG. 14 illustrates node attributes after path determination by the edge node A. Except for the unused relay node a, a value of 1 has been registered in the "Node usage" fields for all nodes, which indicates that all nodes except the relay node a are in-use. FIG. 15 illustrates link attributes after path determination by the edge node A. In the link attributes illustrated in FIG. 15, values have been updated in the "Traffic volume", "Surplus", "Link usage", and "Link cost" fields for the in-use links. For example, the traffic volume for link 1 has been updated to "50", while the surplus has been updated to "30 (80−50)", the link usage to "1", and the link cost to "δ". The updating of the node attributes and the link attributes is conducted by the path controller 105.

In addition, when determining paths, the path controller 105 may impose constraint parameters, which stipulate that the surplus should not become less than or equal to 0. The constraint parameters may also, for example, stipulate that the number of hops should not exceed a limit value. Herein, the number of hops establishes the path length in terms of the number of links along that path.

The edge node A then transmits path information as illustrated in the lower part of FIG. 13 to the edge node B, which determines paths subsequently.

Upon receiving path information from the edge node A, the edge node B determines paths to the other edge nodes. The edge node B first updates the node attributes and the link attributes on the basis of the received path information. At this point, the node attributes and link attributes stored by the edge node B become equivalent to the node attributes and link attributes stored by the edge node A.

Next, the path controller 105 in the edge node B determines the path BA and the path BC, respectively. The required traffic volume is assumed to be 10 Mbps along the path BA and 15 Mbps along the path BC. For the path BA, the path leading from the edge node B to the edge node A has a total link cost of δ. Since this path has the lowest link cost among the potential BA paths, the path controller 105 determines that the path leading from the edge node B to the edge node A is the desired path. Meanwhile, for the path BC, the path leading from the edge node B, to the relay node b, to the edge node C has a total link cost of 2δ. Since this path has the lowest link cost among the potential BC paths, the path controller 105 determines that the path leading from the edge node B, to the relay node b, to the edge node C is the desired path.

FIG. 16 illustrates one example of path determination results by the edge node B. In the example illustrated in FIG. 16, the in-use nodes have not changed, and thus no link costs have been overwritten. The lower part of FIG. 16 illustrates path information after path determination by the path controller 105.

FIG. 17 illustrates node attributes after path determination by the edge node B. Except for the unused relay node a, a value of 1 has been registered in the "Node usage" fields for all nodes, which indicates that all nodes except the relay node a are in-use. FIG. 18 illustrates link attributes after path determination by the edge node B. In the link attributes illustrated in FIG. 18, values have been updated in the "Traffic volume", "Surplus", "Link usage", and "Link cost" fields for the in-use links. For example, the traffic volume for link 2 has been updated to "10", while the surplus has been updated to "70 (80−10)", and the link usage to "1".

The edge node B then transmits path information as illustrated in the lower part of FIG. 16 to the edge node C, which determines paths subsequently.

Upon receiving path information from the edge node B, the edge node C determines paths to the other edge nodes. The edge node C first updates the node attributes and the link attributes on the basis of the received path information. At this point, the node attributes and link attributes stored by the edge node C become equivalent to the node attributes and link attributes stored by the edge node B.

Next, the path controller 105 in the edge node C determines the path CA and the path CB, respectively. The required traffic volume is assumed to be 30 Mbps along the path CA and 20 Mbps along the path CB. For the path CA, the path leading from the edge node C, to the relay node b, to the edge node B, to the edge node A has a total link cost of 3δ. The path controller 105 determines that this path has the lowest link cost among the potential CA paths.

Consequently, the path controller 105 determines that the path leading from the edge node C, to the relay node b, to the edge node B, to the edge node A is the desired path. Meanwhile, for the path CB, the path leading from the edge node C, to the relay node b, to the edge node B has a total link cost of 2δ. The path controller 105 determines that this path has the lowest link cost among the potential CB paths. Consequently, the path controller 105 determines that the path leading from the edge node C, to the relay node b, to the edge node B is the desired path.

FIG. 19 illustrates one example of path determination results by the edge node C. In the example illustrated in FIG. 19, the in-use nodes have not changed, and thus no link costs have been overwritten. The lower part of FIG. 19 illustrates path information after path determination by the path controller 105.

FIG. 20 illustrates node attributes after path determination by the edge node C. Except for the unused relay node a, a value of 1 has been registered in the "Node usage" fields for all nodes, which indicates that all nodes except the relay node a are in-use. FIG. 21 illustrates link attributes after path determination by the edge node C. In the link attributes illustrated in FIG. 21, values have been updated in the "Traffic volume", "Surplus", "Link usage", and "Link cost" fields for the in-use links. For example, the traffic volume for link 12 has been updated to "50", while the surplus has been updated to "30 (80−50)", and the link usage to "1".

According to the above, each edge node determines paths while prioritizing paths indicated by received path information. In so doing, path control may be conducted so as to route traffic along consolidated paths, which enables some nodes on the network to enter a low-power state. Herein, consolidated paths refer to paths that enable sleep nodes to exist on the network as a result of concentrating paths through nodes already in-use.

In the exemplary process 2, it should also be appreciated that if the requested traffic volume is equal to or greater than the surplus on the path calculated to be desired, then the path controller 105 may also divide and forward traffic along both the desired path and the path with the next-smallest total link cost.

In addition, when a number of hops is imposed as a constraint parameter, the total link costs may be calculated for paths that satisfy the constraint on the number of hops, and then one or more paths with small total link costs may be determined.

The foregoing thus describes two examples of methods for determining paths as part of a path control, but is should be appreciated that an embodiment is not limited thereto. Other path determination methods may also be implemented, as long as such methods avoid putting sleep nodes into the wake state whenever possible by having each edge node receive path information and determine paths in order, and prioritize use of the paths indicated by the path information.

In the foregoing examples, the path determination order is set in advance. However, it should be appreciated that paths may also be determined by starting from the edge node that detected the path control trigger. In this case, each edge node may store information indicating the next edge node to determine paths after itself. Also, the edge node that determines paths first may determine that all edge nodes have determined paths once the path information has made a single loop among the edge nodes. The edge node that detected the trigger and subsequently received path information then transmits final path information to the other edge nodes, and broadcasts a notification for terminating path determination. Additionally, when transmitting path information to the next edge node, each edge node may be configured to transmit using a path that does not route through sleep nodes.

Next, state transitions induced in sleep nodes as a result of respective edge nodes re-determining paths will be described.

Figure 22:
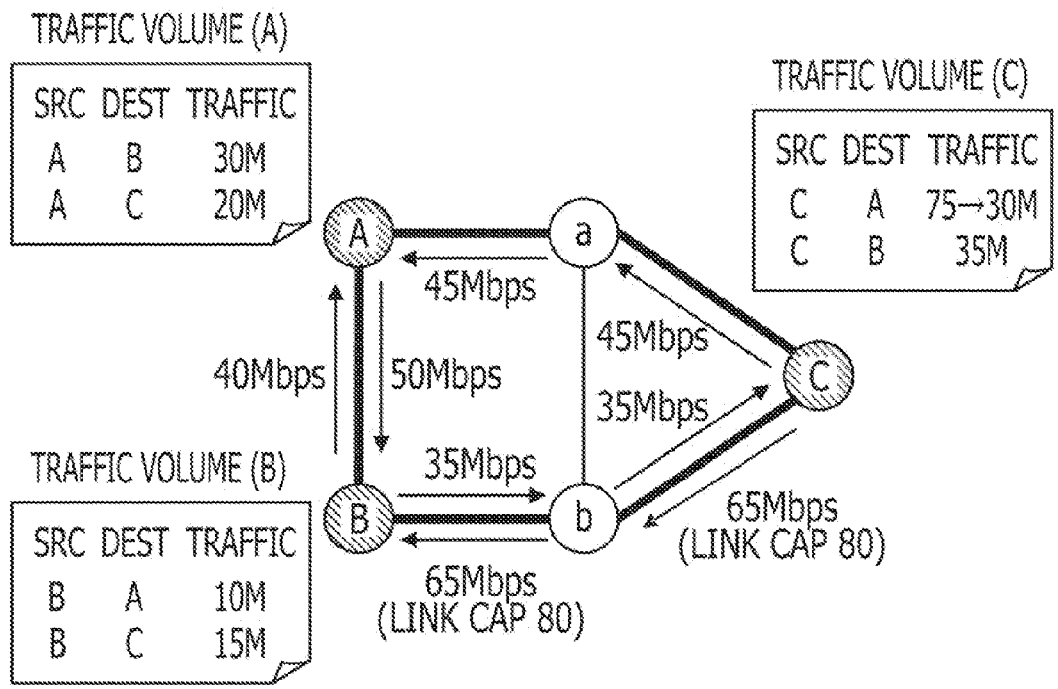
FIG. 22 illustrates path information before path control.

FIG. 22 illustrates path information before path control. All nodes are in use, and the path information is illustrated in the lower part of FIG. 22. Herein, it is assumed that the release threshold value for traffic along the path CA is 30 Mbps. It is also assumed that traffic along the path CA decreases from 75 Mbps to 30 Mbps, and that the path control trigger is detected by the edge node C. At this point, each edge node conducts path control using a path determination method, such as the exemplary processes 1 and 2 described earlier.

Figure 23:
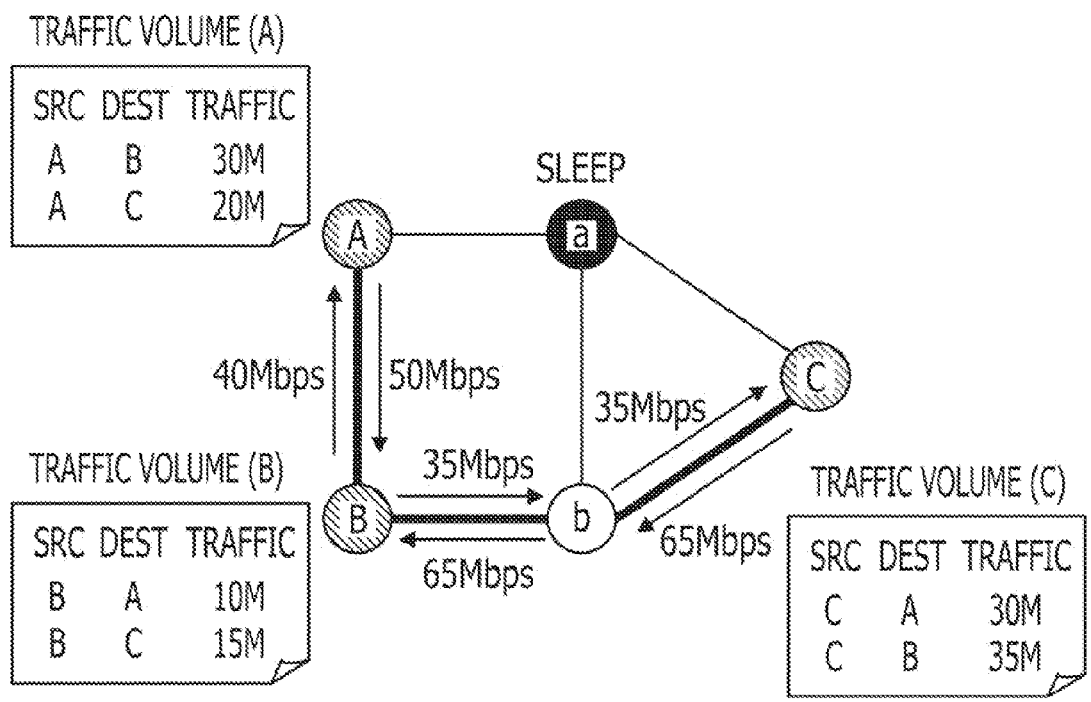
FIG. 23 illustrates path information after path control.

FIG. 23 illustrates path information after path control. As illustrated in FIG. 23, by conducting path control, the traffic volume at the relay node a may be set to 0, and thus the relay node a may be made into a sleep node. The path information after the path control is illustrated in the lower part of FIG. 23.

By conducting the path control described above, it is possible to control paths such that some nodes on a network become sleep nodes, thereby enabling the curtailment of power consumption. The decrease in power consumption as a result of the sleep nodes is greater than the decrease in power consumption resulting from decreasing traffic volume at nodes in the wake state.

Figure 24:
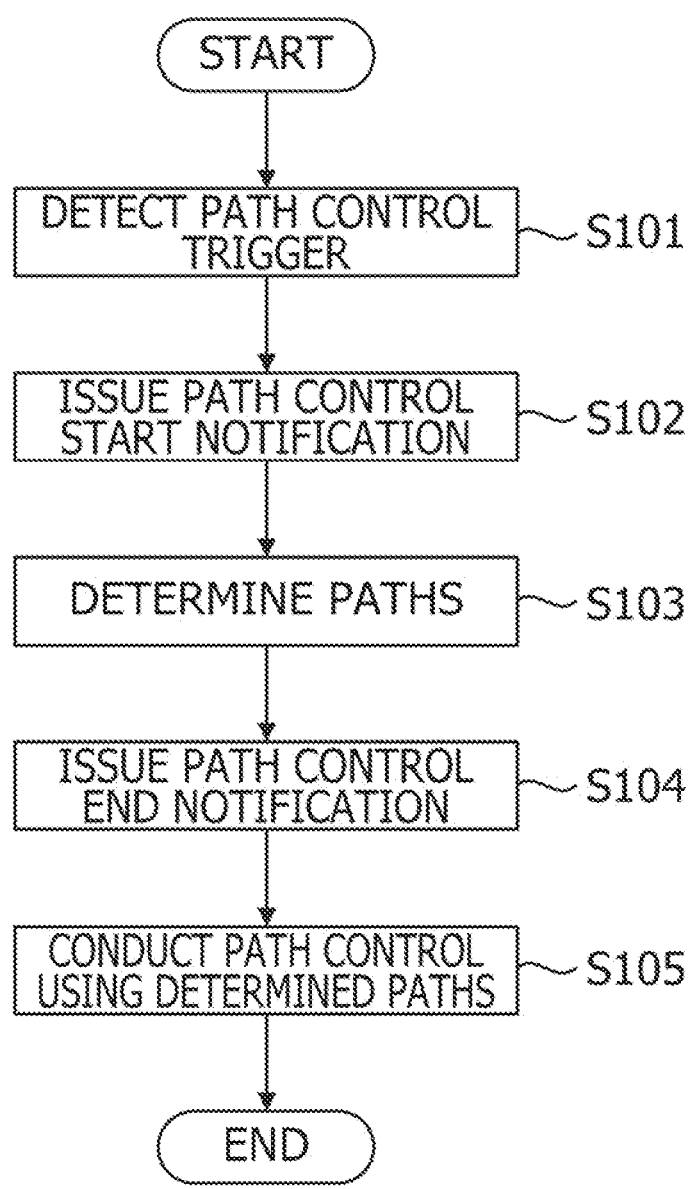
FIG. 24 is a flowchart illustrating one example of path control in a communication system.

Operation of the communication system will now be described. FIG. 24 is a flowchart illustrating one example of path control in a communication system.

In operation S101, an edge node on the network detects a path control trigger when fluctuations in the traffic volume or path quality values causes the traffic volume or path quality values to become equal to or greater than an expansion threshold value, or alternatively, less than or equal to a release threshold value.

In operation S102, the edge node that detected the trigger broadcasts a notification for initiating path determination to the other edge nodes.

In operation S103, each edge node receives path information and determines paths in order. The path determination consolidates paths while prioritizing the use of paths indicated by the path information. In other words, each edge node controls traffic to flow along paths that do not route through sleep nodes.

In operation S104, a notification for terminating path determination is broadcast by an edge node that has determined that all edge nodes have finished determining paths.

In operation S105, final path information is transmitted to other edge nodes by an edge node that has determined that all edge nodes have finished determining paths. Each edge node sets paths on the basis of traffic volume and paths indicated by the received path information, and then initiates the forwarding of traffic along the set paths.

Figure 25:
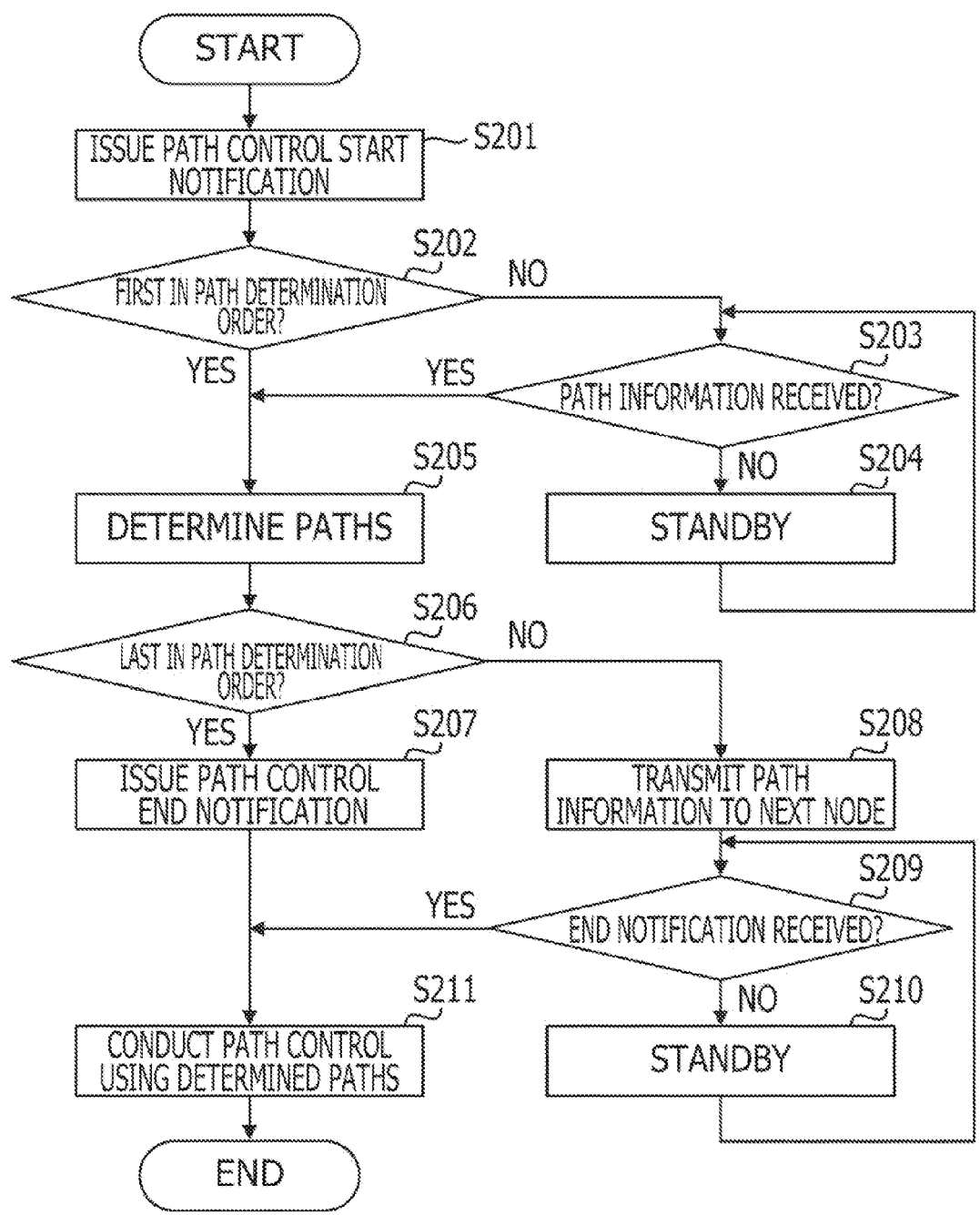
FIG. 25 is a flowchart illustrating one example of a process executed by an edge node that has detected a path control trigger.

FIG. 25 is a flowchart illustrating one example of a process executed by an edge node that has detected a path control trigger. In the example illustrated in FIG. 25, the path determination order is taken to be set in each edge node in advance.

In operation S201, the edge node that has detected the path control trigger (hereinafter also referred to as the trigger edge node) broadcasts a notification for initiating path determination to the other edge nodes. At this point, the edge nodes receiving the broadcast notification transition to a path determination mode. Path determination mode herein refers to a mode wherein a node remains in standby until determining paths.

In operation S202, the trigger edge node determines whether or not itself is the first node in the set path determination order. If the determination result in operation S202 is YES (i.e., if the trigger edge node is the first node in the path determination order), then the process proceeds to operation S205. If the determination result in operation S202 is NO (i.e., if the trigger edge node is not the first node in the path determination order), then the process proceeds to operation S203.

In operation S203, the trigger edge node determines whether or not path information has been received from another edge node. If the determination result in operation S203 is YES (i.e., if path information has been received), then the process proceeds to operation S205. If the determination result in operation S203 is NO (i.e., if path information has not been received), then the process proceeds to operation S204.

In operation S204, the trigger edge node returns to operation S203 and stands by until path information is received from another edge node.

In operation S205, the path controller 105 in the trigger edge node determines consolidated paths so as to enable sleep nodes to exist on the network, as described earlier. At this point, if path information has been received from another edge node, then existing sleep nodes may be maintained in sleep mode by prioritizing the use of paths indicated by the received path information.

In operation S206, the trigger edge node uses the set path determination order to determine whether or not the trigger edge node itself is the last node to determine paths. If the determination result in operation S206 is YES (i.e., if the trigger edge node is the last node in the path determination order), then the process proceeds to operation S207. If the determination result in operation S206 is NO (i.e., if the trigger edge node is not the last node in the path determination order), then the process proceeds to operation S208.

In operation S207, the trigger edge node broadcasts a notification for terminating path determination to the other edge nodes. At this point, the trigger edge node transmits final path information to the other edge nodes.

In operation S208, the trigger edge node transmits path information reflecting the path determination results to the next edge node in the path determination order.

In operation S209, the trigger edge node determines whether or not a notification for terminating path determination has been received. If the determination result in operation S209 is YES (i.e., if a notification has been received), then the process proceeds to operation S211. If the determination result in operation S209 is NO (i.e., if a notification has not been received), then the process proceeds to operation S210.

In operation S210, the trigger edge node returns to operation S209 and stands by until a termination notification is received from another edge node.

In operation S211, the trigger edge node sets paths on the basis of traffic volume and paths indicated by the final path information, and then initiates the forwarding of traffic along the set paths.

Figure 26:
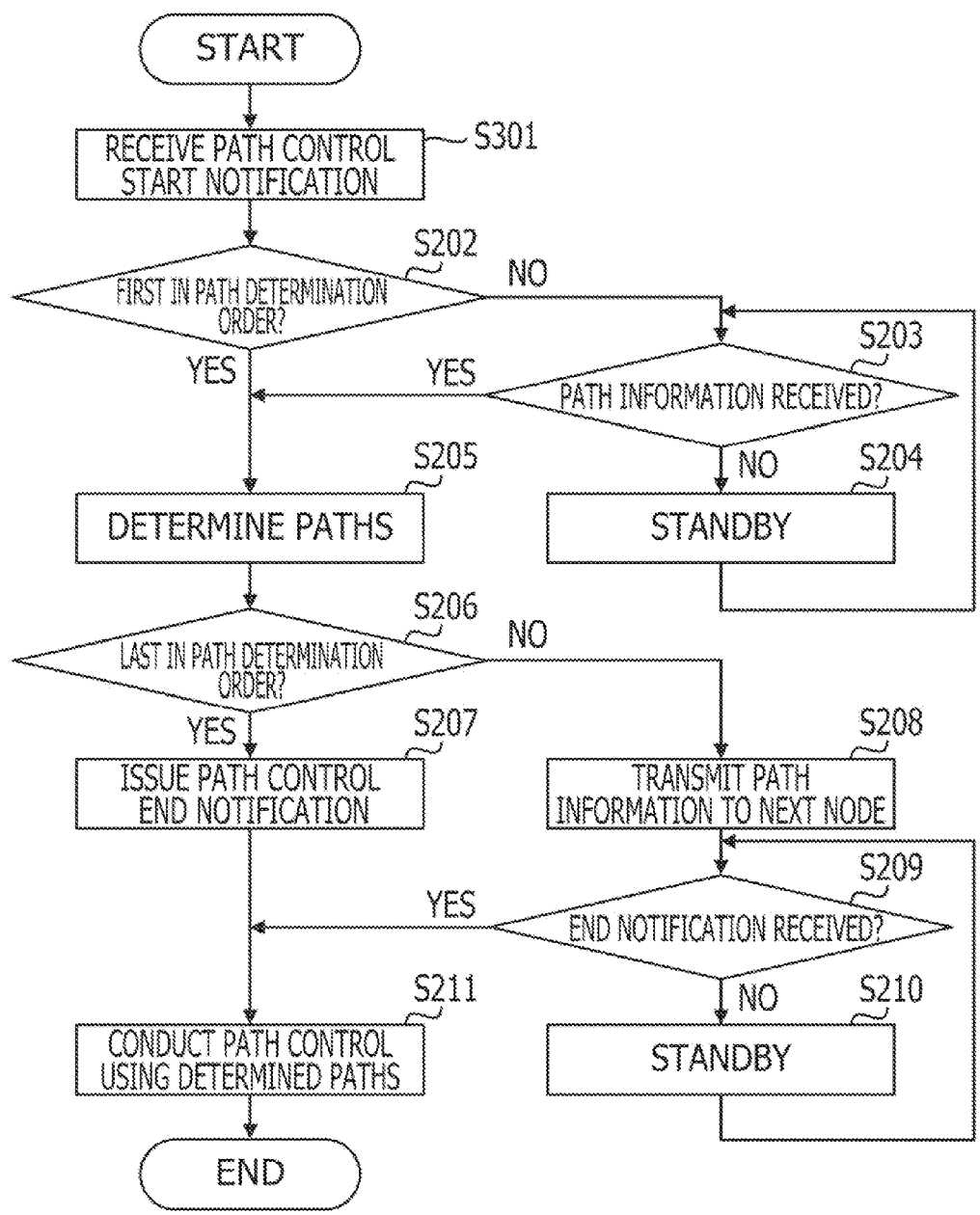
FIG. 26 is a flowchart illustrating one example of a process executed by an edge node that has received a notification for initiating path determination.

FIG. 26 is a flowchart illustrating one example of a process executed by an edge node that has received a notification for initiating path determination. The path determination order in the example illustrated in FIG. 26 is assumed to be set in each edge node in advance. Also, identical reference numbers are given to processing operations illustrated in FIG. 26 that are similar to the processing operations illustrated in FIG. 25, and further description of such processing operations is herein omitted.

In operation S301, an edge node receives a notification for initiating path determination. Hereinafter, the edge node that has received a notification for initiating path determination will also be referred to as the receiving edge node.

In operation S202 and thereafter, the apparatus executing the processing is merely changed to the receiving edge node, with the processing itself being substantially similar to that illustrated in FIG. 25. In other words, the edge node that has detected a path determination trigger executes the process illustrated in FIG. 25, and the other edge nodes execute the process illustrated in FIG. 26, but the basic processing executed by each edge nodes stays substantially the same.

Thus, when determining paths individually at each edge node, paths are set so as to overlap the paths determined by the other edge nodes. For this reason, the paths on the network become consolidated as a result, thereby enabling power consumption to be curtailed. Furthermore, the order in which paths are determined may be set in advance. Alternatively, each node may be set with the next edge node in the path determination order, with path determination being successively conducted at each node starting with the edge node that has detected a trigger. Path determination may then be terminated once path determination has been conducted in a single loop among the edge nodes.

In addition, the edge node that has detected a trigger is configured to broadcast a notification for initiating path determination and transitioning to a path determination mode. However, such a notification is not necessary. Path determination may still be conducted upon receiving path information, without each edge node entering a path determination mode. In this case, the final path information may be received in a manner distinct from intermediate path information.

Next, a communication system in accordance with the exemplary process 3 will be described. The path determination order is not set in each edge node in advance. Instead, each edge node forwards data indicating the path determination order (i.e., a token) in the path determination order. An edge node that has received the token then determines paths.

Figure 27:
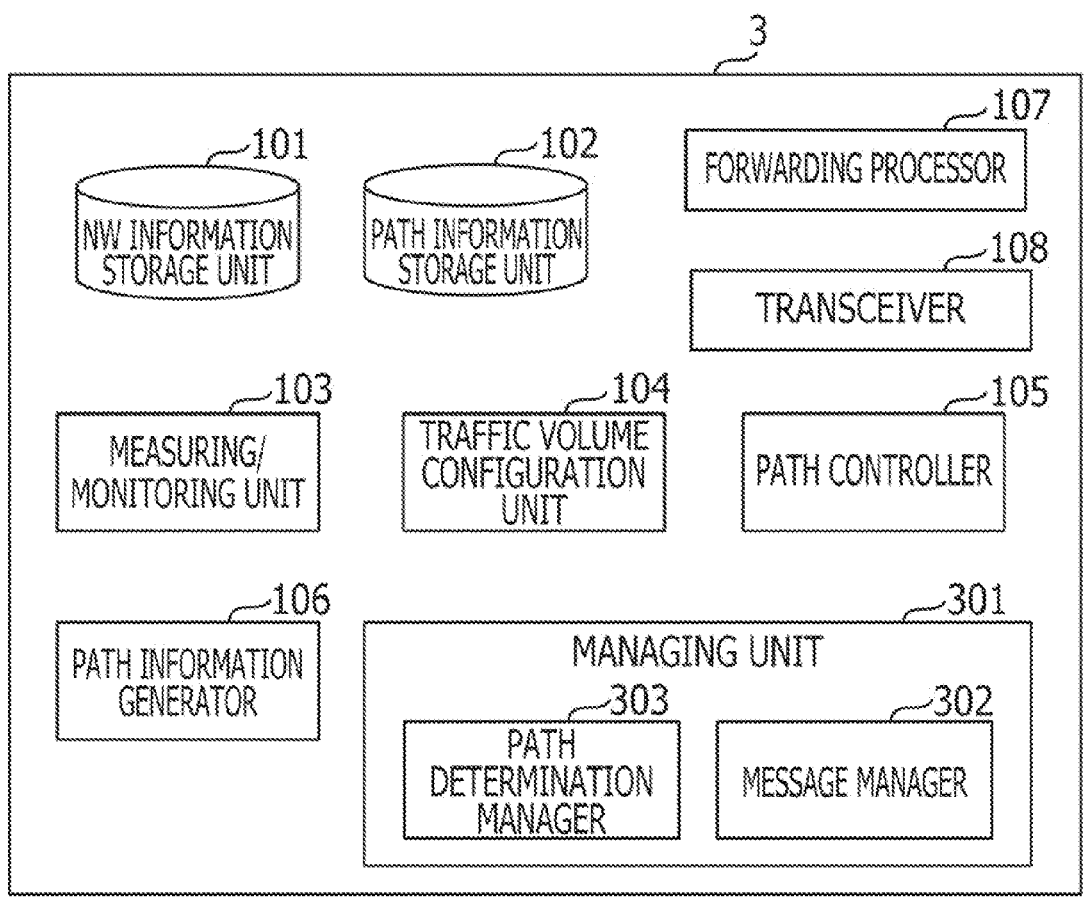
FIG. 27 is a block diagram illustrating one example of the functional configuration of an edge node in accordance with an embodiment.

FIG. 27 is a block diagram illustrating one example of the primary functional configuration of an edge node 3 as described above. Among the functions illustrated in FIG. 27, identical reference numbers are given to functions that are substantially similar to those illustrated in FIG. 4, and further description of such functions is herein omitted.

The managing unit 301 includes a message manager 302 and a path determination manager 303. The message manager 302 manages tokens contained in control messages exchanged among the edge nodes. The control messages are messages for controlling the order in which path information is sent. On the basis of a token contained in a received control message, the message manager 302 is able to determine the next edge node to which a token and path information should be sent.

When the path determination manager 303 detects that its corresponding edge node has received a token and path information, the path determination manager 303 instructs the path controller 105 to determine paths.

The path controller 105 determines consolidated path so as to enable sleep nodes to exist on the network. Herein, the path controller 105 determines consolidated paths within bounds that satisfy constraint parameters, such as link caps based on NW information.

Thus, by successively transmitting a token indicating the path determination order, each edge node is able to receive path information in order, even if the path determination order is not set in the edge nodes in advance. Each edge node may then determine paths on the basis of the received path information.

Tokens will now be described with the use of FIGS. 28 and 29. FIG. 28 illustrates one example of the data structure of a token A. The token A illustrated in FIG. 28 is a token for notifying edge nodes that the last edge node in the path determination order has finished determining paths.

As illustrated in FIG. 28, in the token A, an edge node ID is associated with the edge node ID of the next edge node to receive the token. The information used to identify an edge node may be an edge node ID or the IP address of the edge node, for example.

The path determination order in the token A illustrated in FIG. 28 is as follows: edge node (edge) A, edge node B, edge node C, . . . , edge node X. An edge node is able to determine that it is the last node in the path determination order if no edge node ID or IP address is associated with it in the Next node ID field.

FIG. 29 illustrates one example of the data structure of a token B. The token B illustrated in FIG. 29 is a token that is circulated among edge nodes. The token B is used for notifying edge nodes that the first edge node in the path determination order has finished determining paths.

As illustrated in FIG. 29, in the token B, the edge node A is associated as the next edge node after the edge node X. As a result, the token B is circulated among the edge nodes.

An exemplary path control process will now be described. The path determination method is similar to that described above. In order to simply explanation herein, features such as the network layout and required traffic volume may be similar to those described above.

Figure 30:
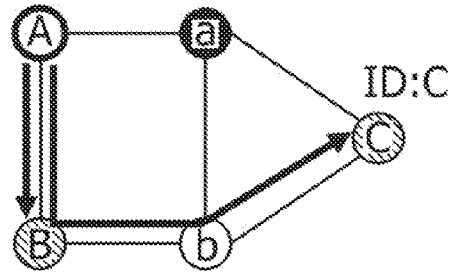
FIG. 30 illustrates the case when an edge node A conducts path determination first.

FIG. 30 illustrates the case when an edge node A conducts path determination first. From the token illustrated in FIG. 30, it may be seen that the edge node A determines paths first. The token illustrated in FIG. 30 is stored by the edge node A that determines paths first. Upon detecting a path control trigger, or upon receiving a notification for initiating path determination, the edge node A determines paths. The path determination results may be similar to those described above. Having determined paths, the edge node A then transmits both path information and the token to the next edge node B.

Figure 31:
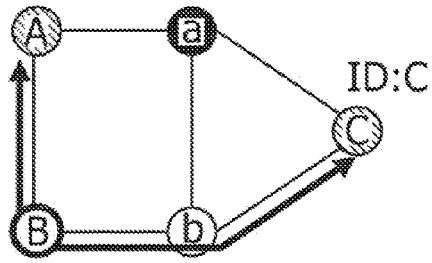
FIG. 31 illustrates the case when an edge node B conducts path determination.

FIG. 31 illustrates the case when an edge node B conducts path determination. Upon receiving the token and path information from the edge node A, the edge node B determines paths on the basis of the received path information. The path determination results may be similar to those described above. Having determined paths, the edge node B then transmits both path information and the token to the next edge node C.

Figure 32:
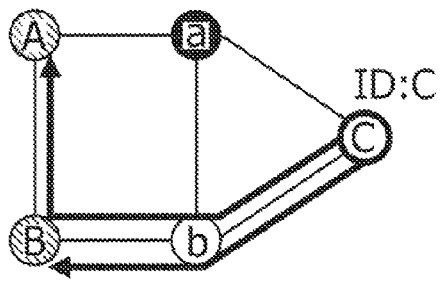
FIG. 32 illustrates the case when an edge node C conducts path determination.

FIG. 32 illustrates the case when an edge node C conducts path determination. Upon receiving the token and path information from the edge node B, the edge node C determines paths on the basis of the received path information. The path determination results are assumed to be similar to those of described above. Having determined paths, the edge node C then determines that there is no next edge node associated with itself in the token, and thus determines that the edge node C itself is the last to determine paths. The edge node C then transmits a notification for terminating path determination as well as the final path information to the other edge nodes.

Path control will now be described for the case wherein the token illustrated in FIG. 29 (hereinafter also referred to as the circulating token) is circulated among the edge nodes. In the case of circulating the circulating token, detection of a path control trigger by the measuring/monitoring unit 103 becomes unnecessary. Each edge node determines paths upon receiving the circulating token and path information, and then transmits the circulating token and path information to the next edge node indicated by the circulating token.

Figure 33:
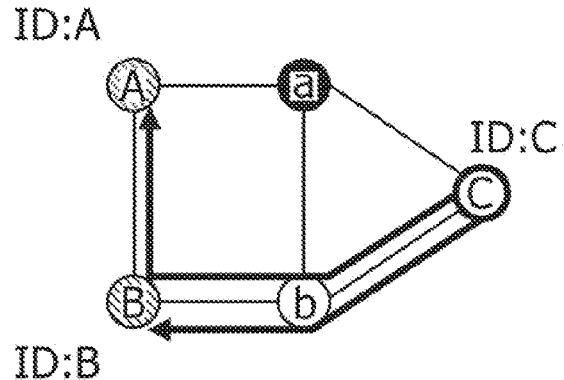
FIG. 33 illustrates the case when an edge node C conducts path determination upon receiving a circulating token.

FIG. 33 illustrates the case when an edge node C conducts path determination upon receiving a circulating token. The token illustrated in FIG. 33 is a circulating token. This circulating token circulates among the edge nodes in the following order: edge node A, edge node B, edge node C, edge node A, edge node B, . . . . In the example illustrated in FIG. 33, the edge node A is taken to be the originating node. Path determination up through the edge node C is similar to the case of using the token A.

After having determined paths, the edge node transmits the circulating token as well as path information to the next edge node indicated by the circulating token (i.e., the edge node A).

Once the circulating token returns to the originating edge node A, the edge node A determines that path determination has finished at all edge nodes. At this point, the edge node A transmits the received, final path information to the other edge nodes. Note that it is not necessary for each edge node to set the traffic volume and paths indicated by the received, final path information. Instead, each edge node may simply set traffic volume and paths when those paths become different from the current paths. This is because it is inefficient to set traffic volume and paths each time the circulating token arrives at an edge node.

As a result, when a circulating token is circulated among edge nodes, it is not necessary for the measuring/monitoring unit 103 to detect triggers. Herein, the path information may be reset when the circulating token has made a single loop.

In addition, when detecting triggers with the measuring/monitoring unit 103 path control similar to that of token A may be conducted by causing a circulating token to circulate through a single loop. In this case, the edge node that has detected a trigger may be set as the originating edge node. By causing a circulating token and path information to circulate through a single loop, the originating edge node is able to determine that all edge nodes have finished determining paths. In so doing, the originating edge node may then transmit final path information to the other edge nodes.

Next, operation of the communication system will be described. The edge node operation hereinafter described is for the case of using a circulating token, wherein detection of path control triggers is not conducted.

Figure 34:
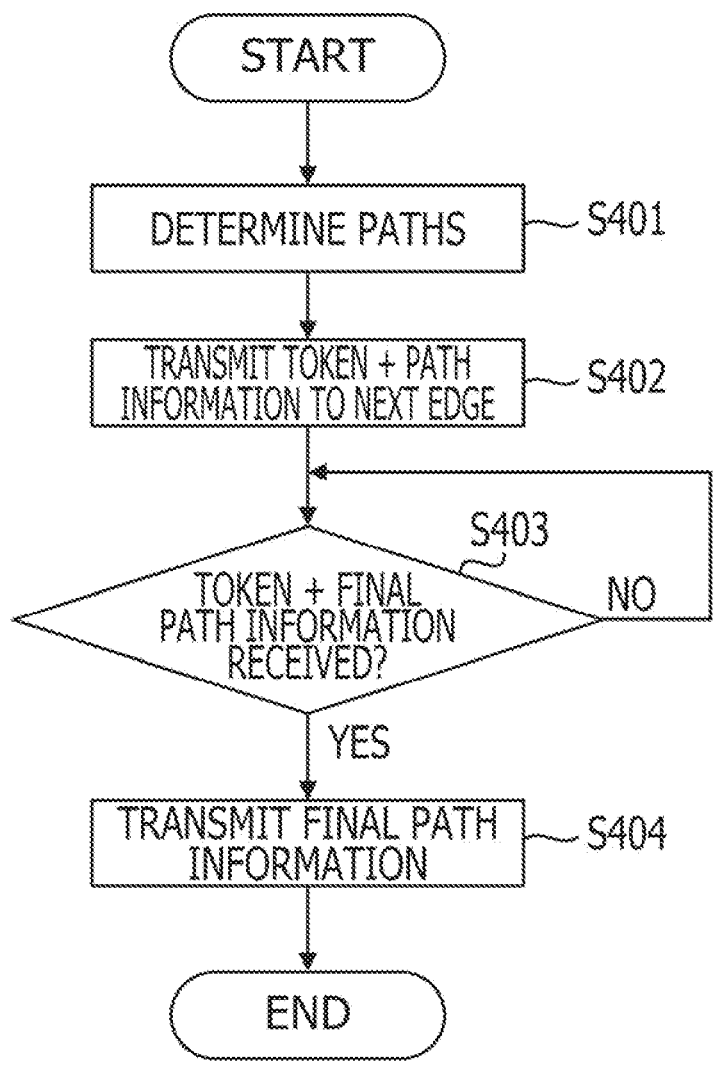
FIG. 34 is a flowchart illustrating one example of a process executed by an originating edge node.

FIG. 34 is a flowchart illustrating one example of a process executed by an edge node acting as the origin. Hereinafter, an edge node acting as the origin will also be referred to as an originating edge node. The originating edge node is set in advance.

In operation S401, the originating edge node determines paths. The path determination method involves determining consolidated paths so as to enable sleep nodes to exist on the network, as described above.

In operation S402, the originating edge node specifies the next edge node from the circulating token, and transmits both the circulating token and path information to the next edge node.

In operation S403, the originating edge node determines whether or not a circulating token and path information have been received. If path information has been received, then the originating edge node determines that it has received final path information reflecting the path determination results from all edge nodes. If the determination result in operation S403 is YES (i.e., if path information has been received), then the process proceeds to operation S404. If the determination result is operation S403 is NO (i.e., if path information has not been received), then the process returns to operation S403.

In operation S404, the originating edge node transmits the received, final path information to the other edge nodes. Subsequently, the originating edge node resets the path information. The originating edge node executes the above process each time the circulating token completes a single loop.

Figure 35:
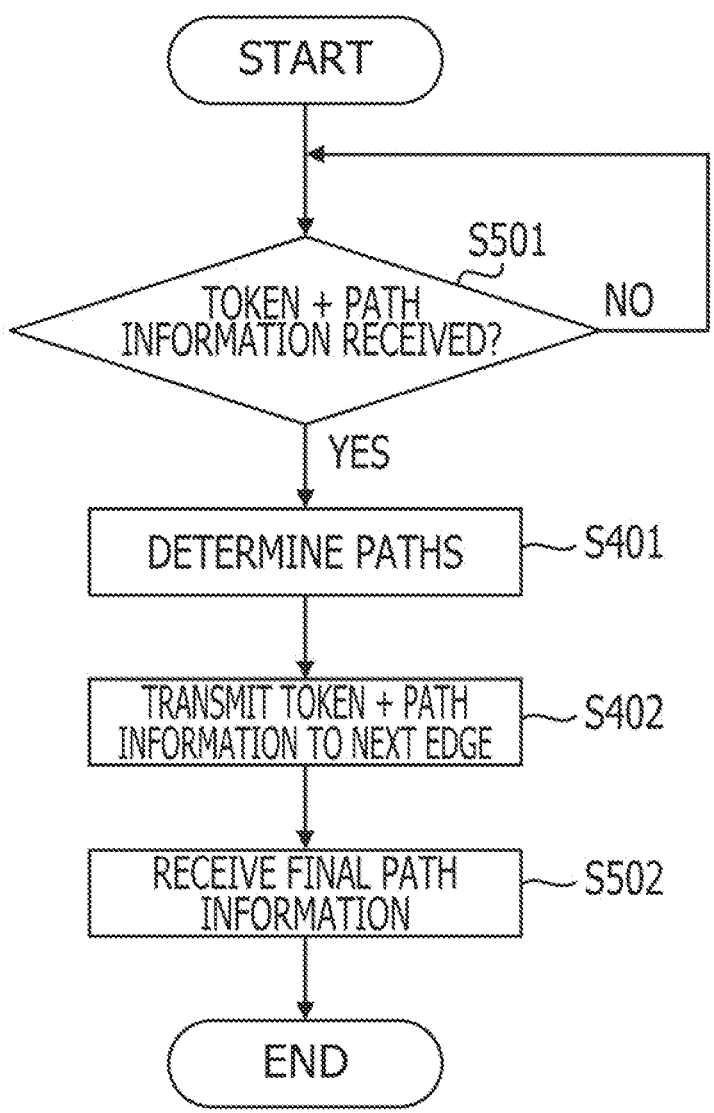
FIG. 35 is a flowchart illustrating one example of a process executed by a non-originating edge node.

FIG. 35 is a flowchart illustrating one example of a process executed by a non-originating edge node. In the process illustrated in FIG. 35, identical reference numbers are given to processing operations that are substantially similar to those in FIG. 34, and further description of such processing operations is herein omitted.

In operation S501, the non-originating edge node determines whether or not a circulating token and path information have been received from another edge node. If the determination result in operation S501 is YES (i.e., if a circulating token and path information have been received), then the process proceeds to operation S401. If the determination result in operation S501 is NO (i.e., if a circulating token and path information have not been received), then the process returns to operation S501.

The processing in operations S401 and S402 illustrated in FIG. 35 is substantially similar to that illustrated in FIG. 34, differing only in that the edge node executing the processing is a non-originating edge node.

In operation S502, the non-originating edge node receives final path information from the originating edge node. Note that, as described earlier, an edge node that has received final path information is not required to set the final path information.

Herein, the case of using a token differs from the processes illustrated in FIGS. 25 and 26 in the following ways: the token is transmitted together with path information; and the path determination order is determined from the token.

Thus, each edge node forwards data indicating the path determination order (i.e., a token) in the path determination order, and without setting the path determination order in each edge node in advance. It is not necessary to detect triggers if a circulating token is used. Furthermore, when each edge node transmits a token and path information to the next edge node, the information is transmitted along paths that do not route through sleep nodes.

Next, a communication system in accordance with an embodiment will be described. A traffic volume configuration unit 401 predicts and sets the traffic volume to be set. In addition, each edge node stores the path determination order and the total number of edge nodes in advance, in order to predict traffic volume.

Figure 36:
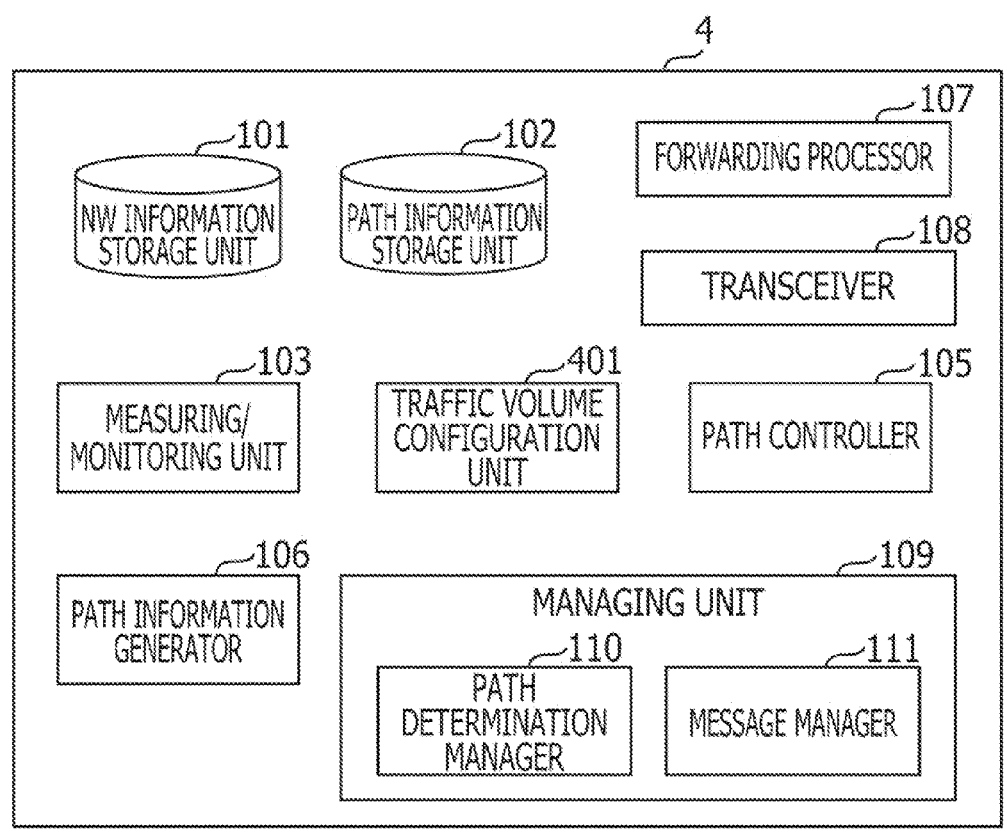
FIG. 36 is a block diagram illustrating one example of the functional configuration of an edge node in accordance with an embodiment.

FIG. 36 is a block diagram illustrating one example of the primary functional configuration of an edge node in accordance with an embodiment. Among the functions illustrated in FIG. 36, identical reference numbers are given to functions that are substantially similar to those illustrated in FIG. 4, and further description of such functions is herein omitted.

From the path determination order set in its own edge node, the traffic volume configuration unit 401 computes the amount of time until paths are updated according to the final path information. The traffic volume configuration unit 401 then sets the traffic volume predicted during the computed amount of time as the traffic volume required for path determination (hereinafter also referred to as the required traffic volume). Herein, the time until paths are updated according to path information (hereinafter also referred to as the update time) is taken to be the amount of time starting from when the current edge node (i.e., the edge node where the operating traffic volume configuration unit 401 is provided) determines paths, and ending when the last edge node finishes determining paths. The prediction of traffic volume uses existing short-term prediction methods (such as linearization techniques, for example).

Figure 37:
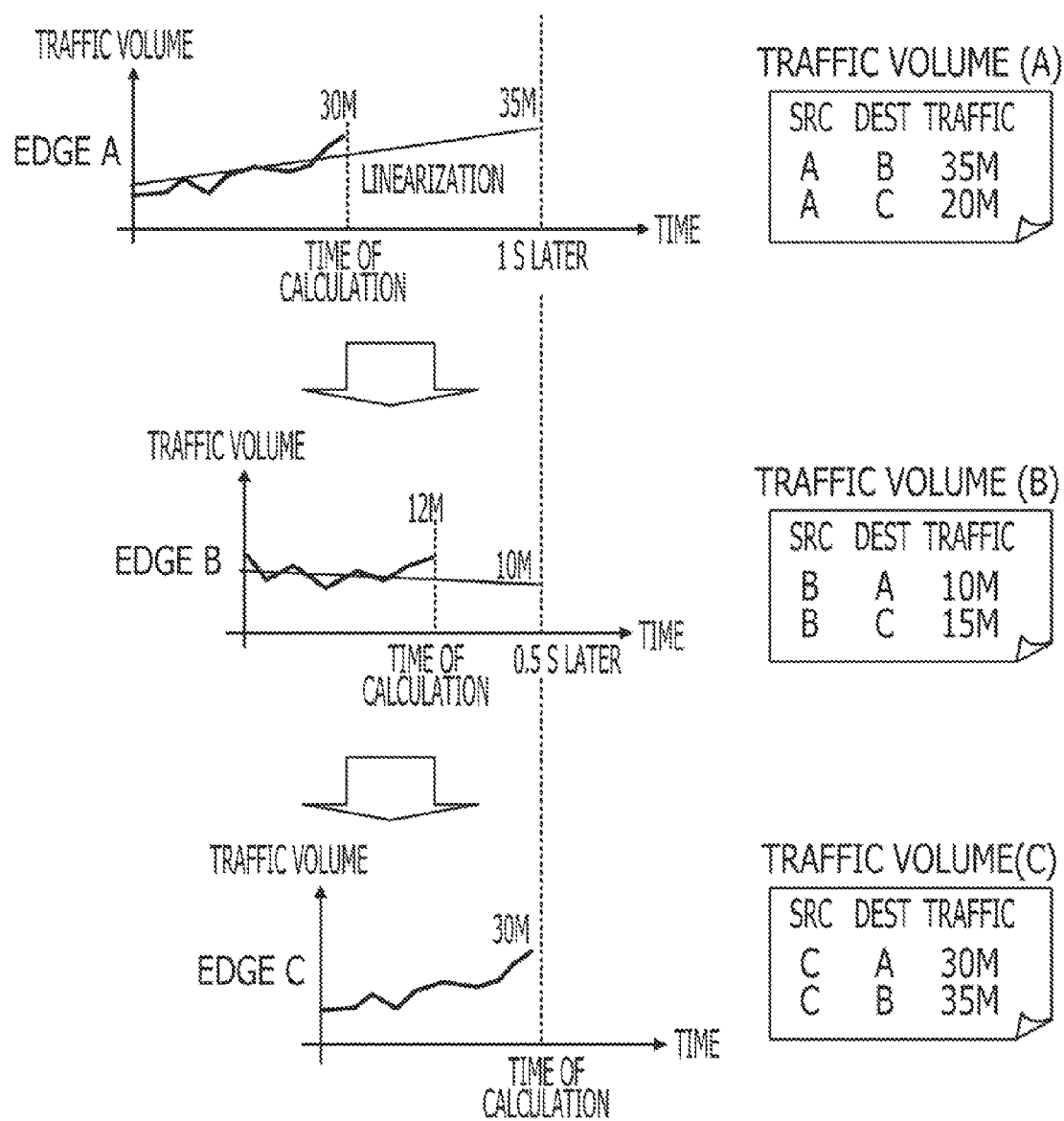
FIG. 37 illustrates traffic volume prediction.

FIG. 37 illustrates traffic volume prediction. The path determination order is taken to be the following: edge node A, edge node B, edge node C. The traffic volume configuration unit 401 in the edge node A predicts the required traffic volume along the path AB by using linearization techniques, for example. More specifically, the traffic volume configuration unit 401 in the edge node A predicts the traffic volume after the update time (i.e., one second later) by using past traffic volume from a specified period of time since the edge node A determined paths. A formula for computing the update time is as follows.

$$\text{Update\_time} = \text{Path\_determination\_time} * (\text{Total\_number\_of\_edge\_nodes} - \text{Path\_determination\_order})$$

In the above example, assume that the path determination time is 0.5 seconds, that the total number of edge nodes is 3, and that the edge node A is first in the path determination order. Given these values, the update time becomes 0.5*(3−1)=1.

Next, the traffic volume configuration unit 401 in the edge node B predicts the required traffic volume along the path BA by using linearization techniques, for example. The update time becomes 0.5*(3−2)=0.5. Consequently, the traffic volume configuration unit 401 in the edge node B predicts the traffic volume after 0.5 seconds.

Since the edge node C is the last edge node, its update time becomes 0. In other words, the traffic volume configuration unit 401 in the edge node C sets the current traffic volume as the required traffic volume along the path CA.

In the example illustrated in FIG. 37, traffic volume are predicted along the paths AB, BA, and CA. However, traffic volume may also be predicted along all paths.

The above example describes the case wherein the edge node that has detected a trigger does not broadcast a notification for initiating path determination. The decision of whether or not to broadcast a notification for initiating path determination also determines when the traffic volume used for path calculation are to be measured. In the case where a start notification is not broadcast, traffic is measured when a node reaches its turn in the path calculation order. In the case where a start notification is broadcast, traffic is measured when the start notification is received.

Meanwhile, in the case where the edge node that has detected a trigger broadcasts a notification for initiating path determination, edge nodes receiving the start notification measure traffic substantially simultaneously, and the update time is set as follows.

$$\text{Update\_time} = \text{Path\_determination\_time} * (\text{Total\_number\_of\_edge\_nodes} - 1)$$

In the case where a start notification is broadcast and traffic is measured simultaneously, the amount of time until traffic forwarding is resumed on the calculated paths becomes the same, and thus the update time also becomes the same for each edge node.

Thus, it is possible to predict the traffic volume for when traffic forwarding will be actually started on the determined paths, and paths may be determined on the basis of the predicted values.

Next, a communication system in accordance with an embodiment will be described. The traffic volume set by each node when determining paths is taken to be list information regarding traffic demand (hereinafter also referred to as a demand list) set in advance by the operator. By forwarding the demand list to each edge node in order, each node is able to set the traffic volume to use for path determination from the demand list.

Figure 38:
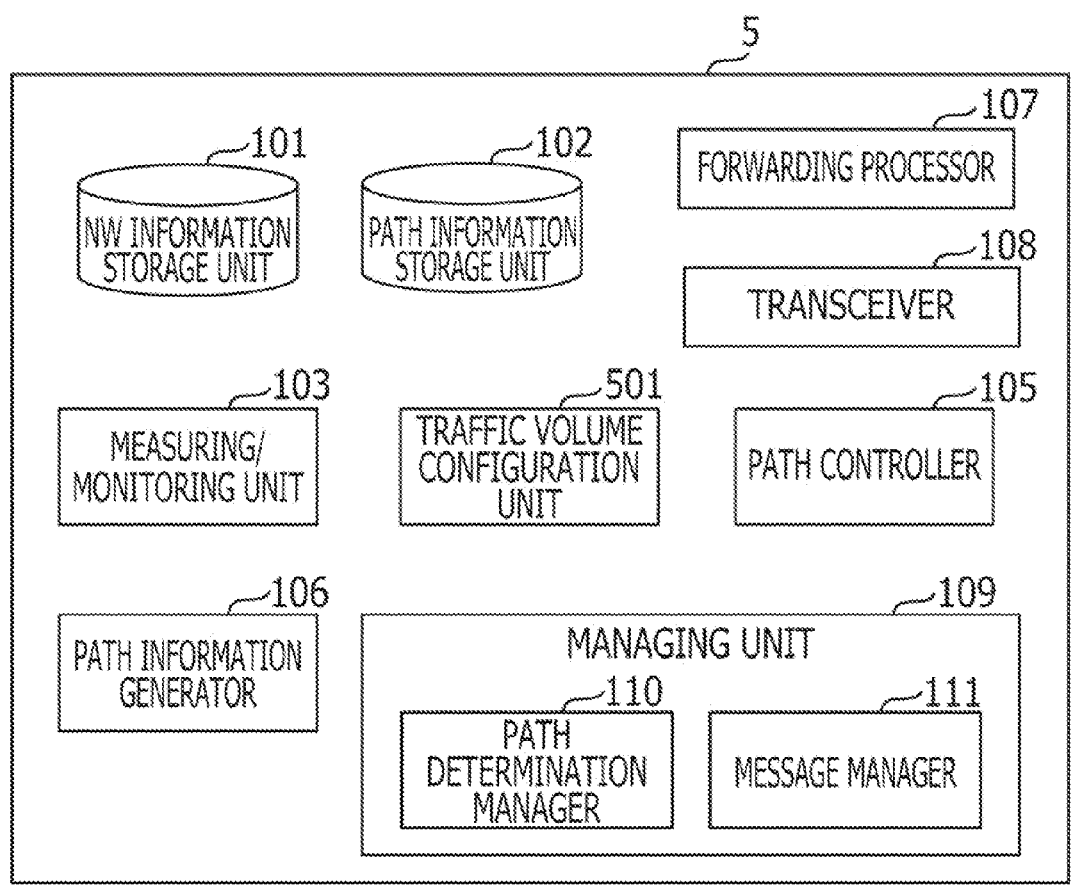
FIG. 38 is a block diagram illustrating one example of the functional configuration of an edge node in accordance with an embodiment.

FIG. 38 is a block diagram illustrating one example of the primary functional configuration of an edge node 5 in accordance with an embodiment. Among the functions illustrated in FIG. 38, identical reference numbers are given to functions that are substantially similar to those illustrated in FIG. 4, and further description of such functions is herein omitted. Herein, the demand list is set in advance by the operator, and is stored by or transmitted to the first edge node in the path determination order.

The traffic volume configuration unit 501 acquires the traffic volume from the demand list having "Src" values that match the current edge node (i.e., the edge node where the operating traffic volume configuration unit 501 is provided). The traffic volume configuration unit 501 then sets the traffic volume to be used for path determination.

FIG. 39 illustrates one example of a demand list. As illustrated in FIG. 39, the traffic volume configuration unit 501 in the edge node A acquires the traffic volume from the demand list having "Src" values of "A". The traffic volume configuration unit 501 sets the following required traffic volume: 35 Mbps for the path AB, and 20 Mbps for the path AC. The edge node A then deletes the acquired traffic volume from the demand list, and transmits both the demand list and path information to the next edge node B.

Next, the traffic volume configuration unit 501 in the edge node B acquires the traffic volume from the demand list having "Src" values of "B". The traffic volume configuration unit 501 sets the following required traffic volume: 10 Mbps for the path BA, and 15 Mbps for the path BC. The edge node B then deletes the acquired traffic volume from the demand list, and transmits both the demand list and path information to the next edge node C.

The traffic volume configuration unit 501 in the edge node C acquires the traffic volume from the demand list having "Src" values of "C". The traffic volume configuration unit 501 sets the following required traffic volume: 30 Mbps for the path CA, and 35 Mbps for the path CB. The edge node C is the last node in the path determination order, and thus it is not necessary to transmit the demand list. The edge node C then transmits final path information to the other edge nodes.

In the example illustrated in FIG. 39, each edge node is configured to delete its acquired traffic volume from the demand list. However, deletion is not strictly necessary. Furthermore, it should also be appreciated that the demand list may be included in the data portion of a control message or packet.

Thus, a demand list set by the operator may be used as a basis for determining paths. In addition, when each edge node transmits the demand list and path information to the next edge node, the information is transmitted along paths that do not route through sleep nodes.

Next, exemplary modifications of the foregoing embodiments will now be described. It is also possible for the path determination processing operations described in the respective embodiments described above to be realized as a program for causing such processing operations to be executed on a computer. By installing and causing such a program to be executed on a computer, the processing operations described above may be realized.

Moreover, such a program may be recorded onto a recording medium (such as a compact disk read-only memory (CD-ROM) or secure digital (SD) card, for example). It is thus possible for the path determination processing operations described above to be realized by causing a recording medium storing such a program to be read by a computer or similar device. Herein, various types of recording media may be used as the recording medium, including: a recording medium that optically, electrically, or magnetically records information, such as a CD-ROM, flexible disk, or magneto-optical disc; or semiconductor memory that electrically records information, such as ROM or flash memory.

In addition, in the respective embodiments, only relay nodes are described as becoming sleep nodes, but it should be appreciated that edge nodes may also become sleep nodes. In this case, if a particular edge node determines from the path information that the next edge node is a sleep node, then path information may be transmitted to the next edge node after the sleep node. Consequently, each edge node may be configured to store not only information regarding the next edge node, but to multiply store information regarding all edge nodes subsequent to itself. Meanwhile, in the case of using a token, the place of each edge node in the path determination order may be determined from the token. For this reason, it is possible to easily realize operation, even in the case where edge nodes become sleep nodes.

The foregoing thus describes exemplary embodiments and modifications in detail, but it should be appreciated that an embodiment is not limited to the specific embodiments herein, and that various modifications and alterations other than those described in the foregoing modifications are possible without departing from the scope stated in the claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has (have) been described in detail, it should be understood that the various changes, substitutions, and alterations could be made hereto without departing from the spirit and scope of the invention.

The invention claimed is:

1. A path control method of controlling paths on a network wherein a plurality of nodes, including one or more relay nodes and a plurality of edge nodes, are connected via links, the method comprising:
    performing, at each of the edge nodes, path determination that includes:
    receiving path information indicating paths for forwarding data among the edge nodes, the paths previously determined by another edge node, among the edge nodes, that performs the path determination earlier than the each of the edge nodes,
    determining the paths for forwarding the data based on the paths indicated by the received path information and a state of the one or more relay nodes, and
    updating the received path information based on the paths determined by the each of the edge nodes;
    performing sequentially the path determination by all of the edge nodes; conducting path control on the network by using the path information indicating the paths determined by a last edge node among the edge nodes after the path determination is sequentially performed by the all of the edge nodes; and
    predicting traffic volume at the time path control will end, on the basis of traffic volume measured during the path determination, wherein the paths are determined based on the predicted traffic volume and the path information.

2. The path control method according to claim 1, further comprising:
    transmitting, from one of the edge nodes, a notification for initiating the path determination;
    starting, at the one of the edge nodes, the path determination after the notification is transmitted; and
    forwarding the data on the basis of the path information indicating the paths determined by the last edge node.

3. The path control method according to claim 1, further comprising—
    storing a cost defined for each link of the links;
    selecting paths having reduced costs as defined for the links along the paths; and
    updating costs defined for the links linking to one of the one or more relay nodes that processes traffic on the paths, to values that are smaller than costs defined for the links linking to another of the one or more relay nodes in a low-power state on the paths.

4. The path control method according to claim 1, wherein the determining determines the paths upon receiving order information that indicates an order in which the determining is to be performed among the edge nodes, and further comprising:
    transmitting both the order information and the path information to a subsequent edge node after the each of the edge nodes as indicated by the order information.

5. The path control method according to claim 1, further comprising transmitting the updated path information indicating the paths determined by the each of the edge nodes to a subsequent edge node after the each of the edge nodes.

6. The path control method according to claim 1, wherein the paths extend from a first edge node to a second edge node.

7. The path control method according to claim 1, wherein the determining determines the paths by selecting the paths from candidates paths between two of the edge nodes, the candidates paths using the paths indicated by the received path information, so that a first candidate path is selected with higher priority than that of a second candidate path among the candidate paths, the first candidate path not including the one or more relay nodes in a low-power state, and the second candidate path including the one or more relay nodes in the low-power state.

8. The path control method according to claim 1, wherein the determining determines the paths by selecting the paths from candidates paths between two of the edge nodes, so that a first candidate path is selected with higher priority than that of a second candidate path among the candidate paths, the first candidate path using the paths indicated by the received path information, and the second candidate path not using the paths indicated by the received path information.

9. The path control method according to claim 1, further comprising determining the paths for forwarding the data to enable at least one of the one or more relay nodes in a low-power state to exist on the network.

10. The path control method according to claim 1, wherein the determining determines the paths from candidate paths based on the received path information and traffic volume on the candidate paths using the paths indicated by the received path information, so that the traffic volume satisfies a given condition.

11. The path control method according to claim 1, wherein the conducting conducts the path control in accordance with a notification for terminating the path determination transmitted from the last edge node.

12. A communication system configured to control paths on a network wherein a plurality of nodes are connected via links, the communication system comprising:
one or more relay nodes included in the plurality of nodes, each of the relay nodes including a first processor configured to put the each of the relay nodes into a low-power state when the relay node is not processing traffic; and
a plurality of edge nodes included in the plurality of nodes, each of the edge nodes including
a second processor configured to:
perform path determination that includes:
receiving path information indicating paths for forwarding data among the edge nodes, the paths previously determined by another edge node, among the edge nodes, that performs the path determination earlier than the each of the edge nodes,
determining the paths for forwarding the data based on the paths indicated by the received path information and a state of the one or more relay nodes, and
updating the received path information based on the paths determined by the each of the edge nodes,
conduct path control on the network by using the path information indicating the paths determined by a last edge node among the edge nodes after the path determination is sequentially performed by all of the edge nodes; and
predict traffic volume at the time path control will end, based on traffic volume measured during the path determination, wherein the paths are determined based on the predicted traffic volume and the path information.

13. The communication system according to claim 12, wherein the each of the edge nodes further includes a transmitter configured to transmit the updated path information indicating the paths determined by the each of the edge nodes, to a subsequent edge node after the each of the edge nodes.

14. The communication system according to claim 12, wherein the determining determines the paths from candidate paths based on the received path information and traffic volume on the candidate paths using the paths indicated by the received path information, so that the traffic volume satisfies a given condition.

15. The communication system according to claim 12, wherein the conducting conducts the path control in accordance with a notification for terminating the path determination transmitted from the last edge node.

16. A communication apparatus on a network wherein a plurality of apparatuses, including one or more relay apparatuses and a plurality of communication apparatuses, are connected via links, the plurality of communication apparatuses including the communication apparatus and positioned at boundaries or entrances of networks, the communication apparatus comprising:
a memory; and
a processor coupled to the memory and configured to:
perform path determination that includes:
receiving path information indicating paths for forwarding data among the communication apparatuses, the paths previously determined by another communication apparatus, among the communication apparatuses, that performs the path determination earlier than the communication apparatus,
determining the paths for forwarding the data based on the paths indicated by the received path information and a state of the one or more relay nodes, and
updating the received path information based on the paths determined by the communication apparatus,
conduct path control on the network by using the path information indicating the paths determined by a last communication apparatus among the communication apparatuses after the path determination is sequentially performed by all of the communication apparatuses; and
predict traffic volume at the time path control will end, based on traffic volume measured during the path determination, wherein the paths are determined based on the predicted traffic volume and the path information.

17. The communication apparatus according to claim 16, further comprising a transmitter configured to transmit the updated path information indicating the paths determined by the communication apparatus, to a subsequent edge node after the communication apparatus among the communication apparatuses.

18. The communication apparatus according to claim 16, wherein the determining determines the paths from candidate paths based on the received path information and traffic volume on the candidate paths using the paths indicated by the received path information, so that the traffic volume satisfies a given condition.

19. The communication apparatus according to claim 16, wherein the conducting conducts the path control in accordance with a notification for terminating the path determination transmitted from the last communication apparatus.

* * * * *